United States Patent [19]

Schlanger

[11] Patent Number: 5,941,135
[45] Date of Patent: Aug. 24, 1999

[54] BICYCLE CRANKSHAFT ASSEMBLY

[76] Inventor: Raphael Schlanger, 128 Hulda Hill Rd., Wilton, Conn. 06897

[21] Appl. No.: 08/878,426

[22] Filed: Jun. 18, 1997

[51] Int. Cl.⁶ .................................................... B62M 3/00
[52] U.S. Cl. .......................................................... 74/594.1
[58] Field of Search ................................ 74/594.1, 594.2, 74/594.3

[56] References Cited

U.S. PATENT DOCUMENTS

| | | |
|---|---|---|
| 602,049 | 4/1898 | Beard . |
| 737,603 | 9/1903 | Fritz ................................... 74/594.2 X |
| 2,350,468 | 6/1944 | Kraeft . |
| 3,648,542 | 3/1972 | Perotti et al. ......................... 74/594.1 |
| 3,906,811 | 9/1975 | Thun . |
| 4,171,822 | 10/1979 | Thun . |
| 4,358,967 | 11/1982 | Kastan ............................... 74/594.1 X |
| 4,704,919 | 11/1987 | Durham . |
| 4,811,626 | 3/1989 | Bezin . |
| 5,010,785 | 4/1991 | Romero . |
| 5,363,721 | 11/1994 | Hsiao ................................. 74/594.1 |
| 5,493,937 | 2/1996 | Edwards . |

FOREIGN PATENT DOCUMENTS

| | | | |
|---|---|---|---|
| 955017 | 1/1950 | France ................................. 74/594.1 |
| 2587965 | 4/1987 | France ................................. 74/594.1 |
| 7456 | of 1903 | United Kingdom ................. 74/594.1 |

*Primary Examiner*—John A. Jeffery
*Assistant Examiner*—Mary Ann Battista
*Attorney, Agent, or Firm*—Bachman & LaPointe, P.C.

[57] ABSTRACT

The bicycle crankshaft assembly includes two crank arms having end portions thereof, a crank axle having two end portions thereof, with one of the crank arms attached to one of the axle end portions and another of the crank arms attached to the other of the axle end portions, and a crank arm insert affixed to at least one of the axle end portions and affixed to one of the crank arms end portions for connection of the crank arm to the crank axle.

62 Claims, 24 Drawing Sheets

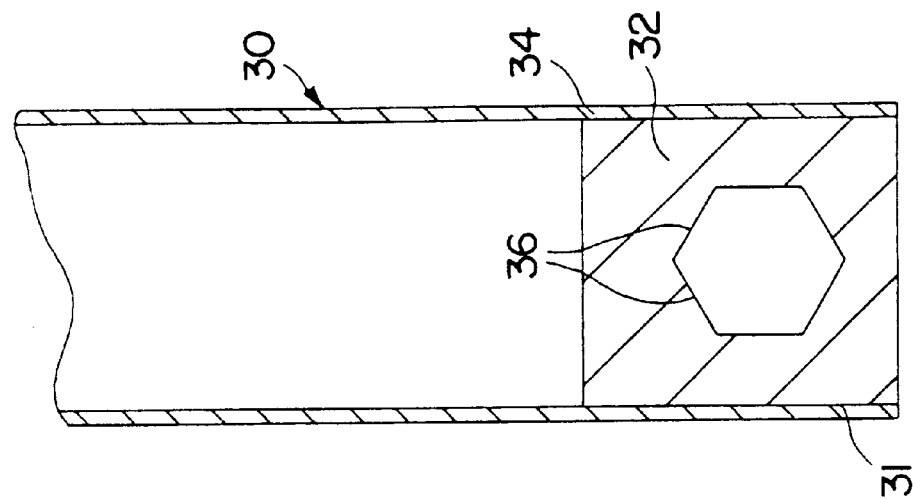
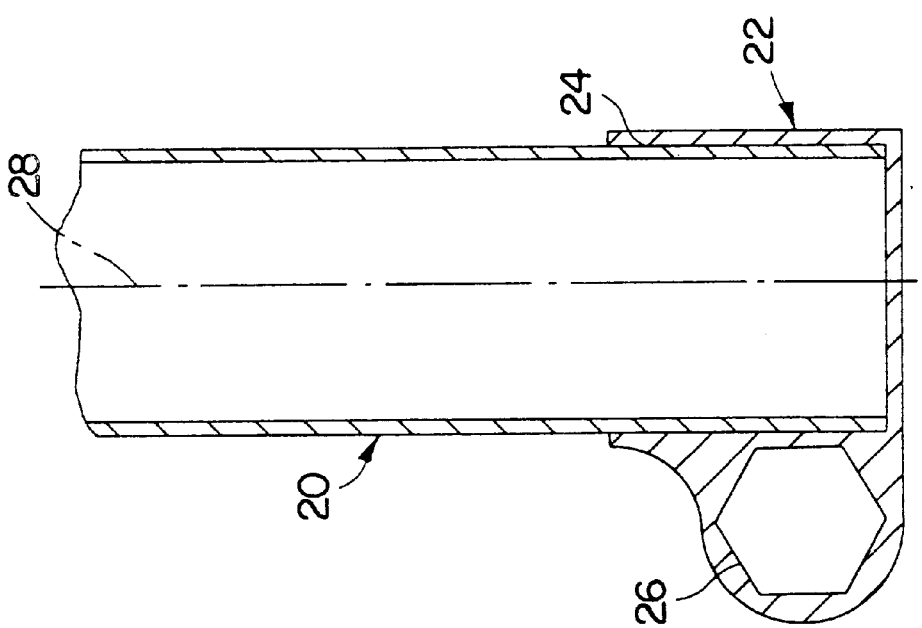
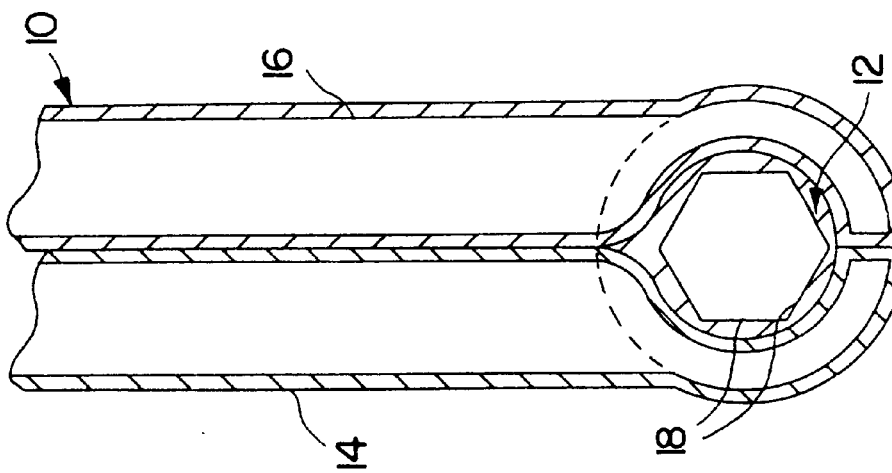

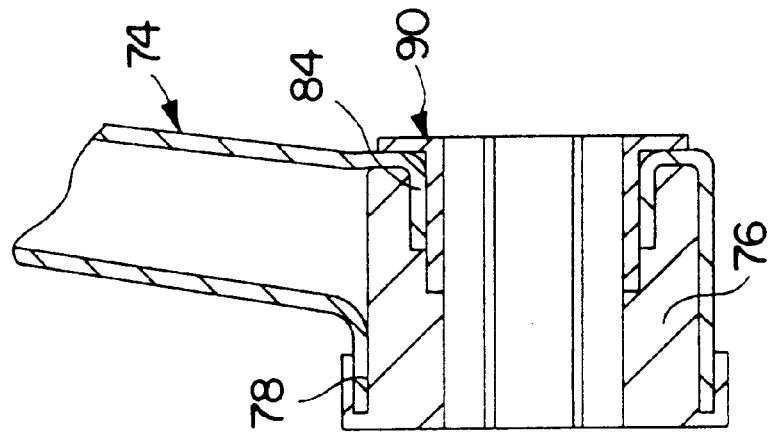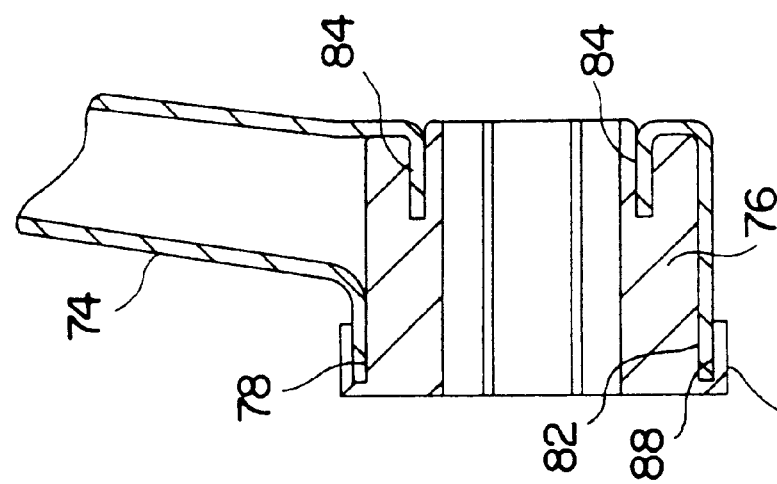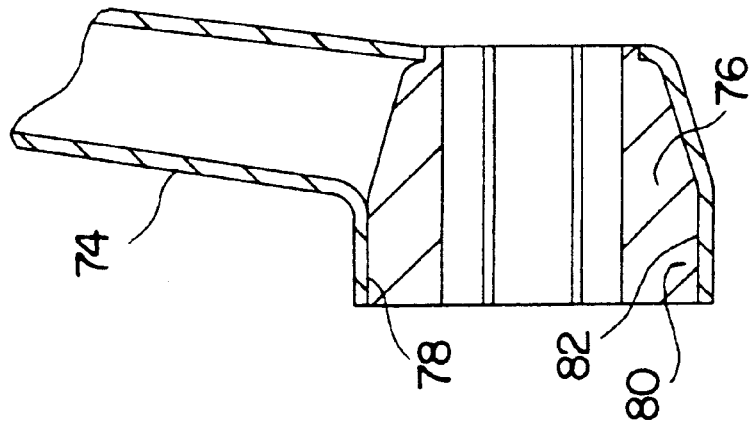

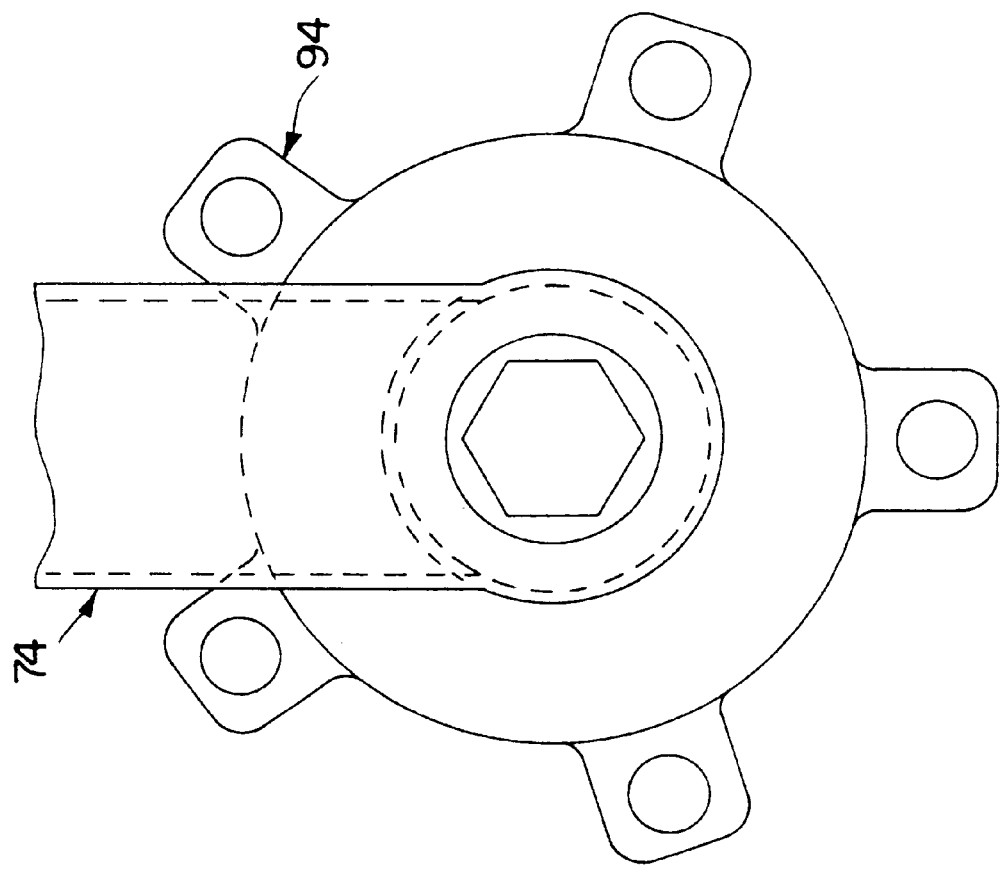
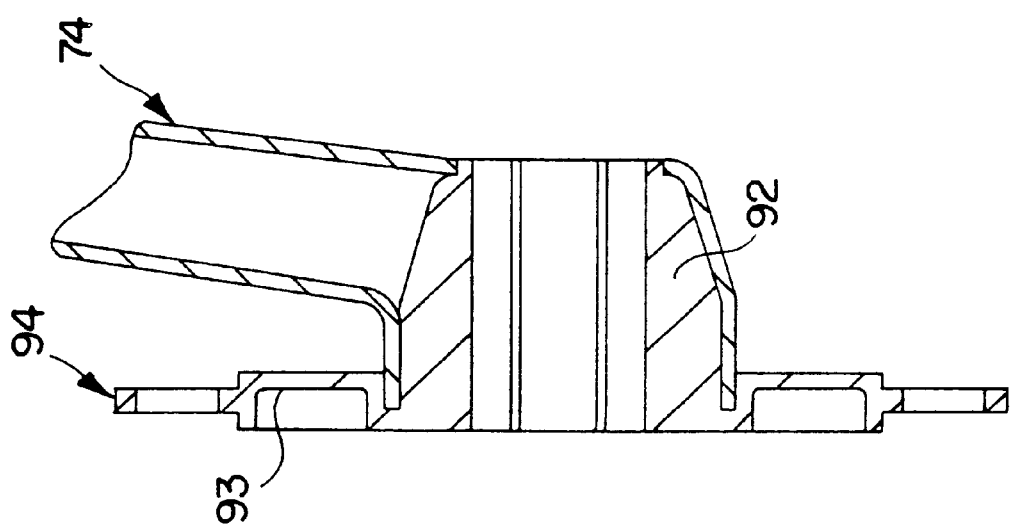

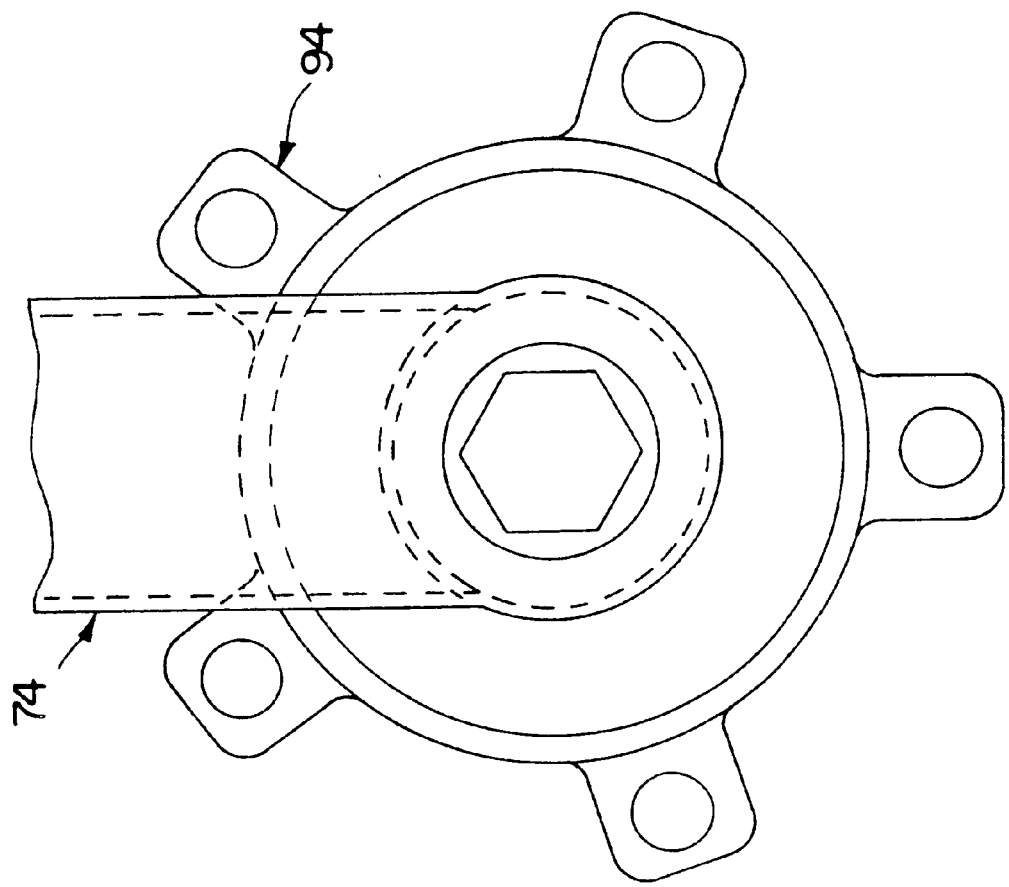
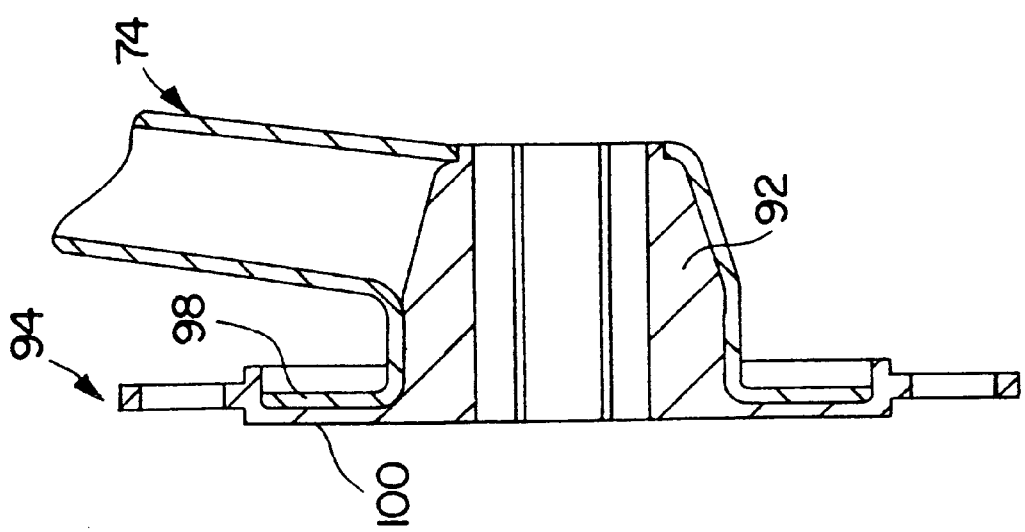

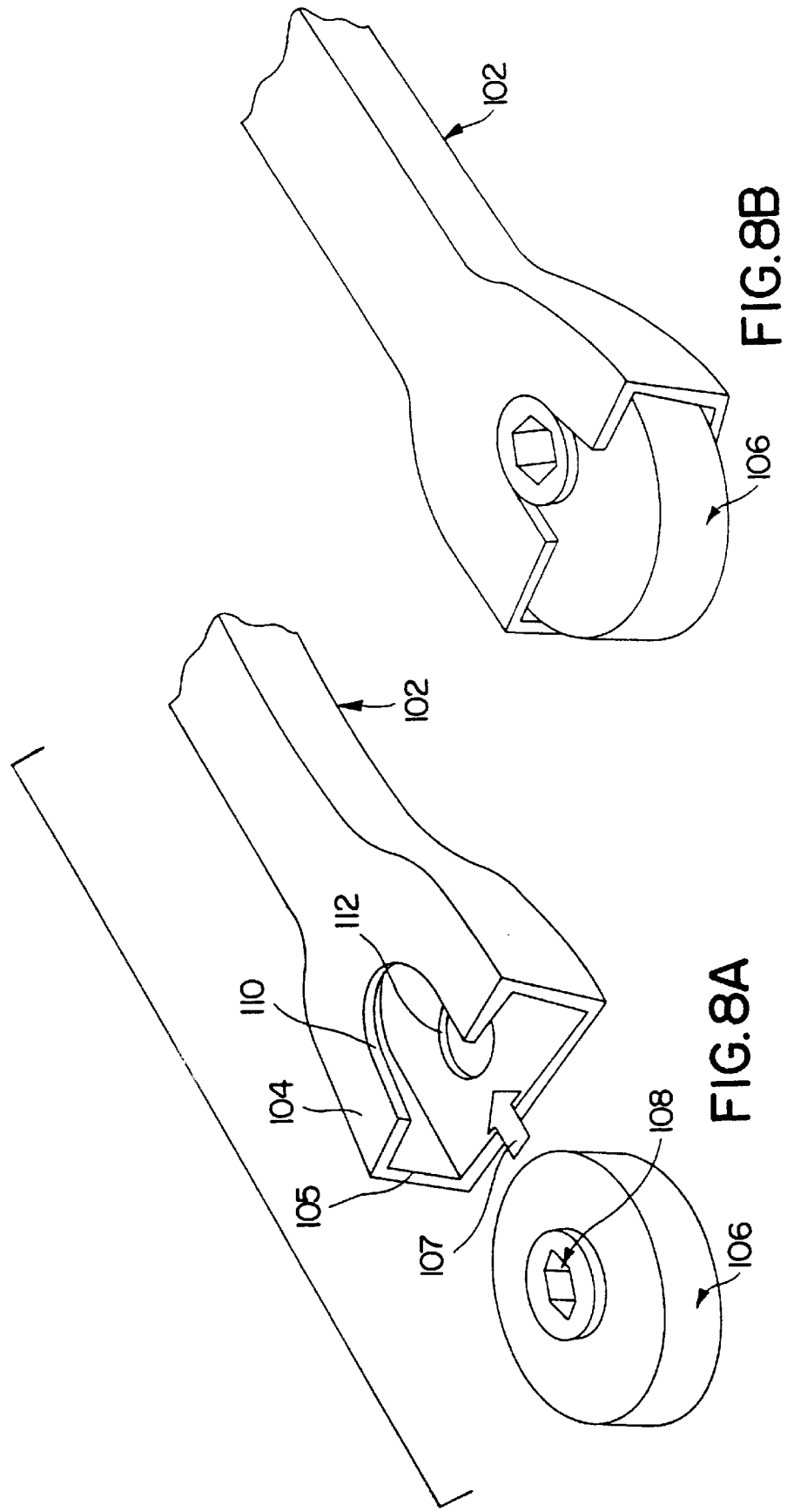

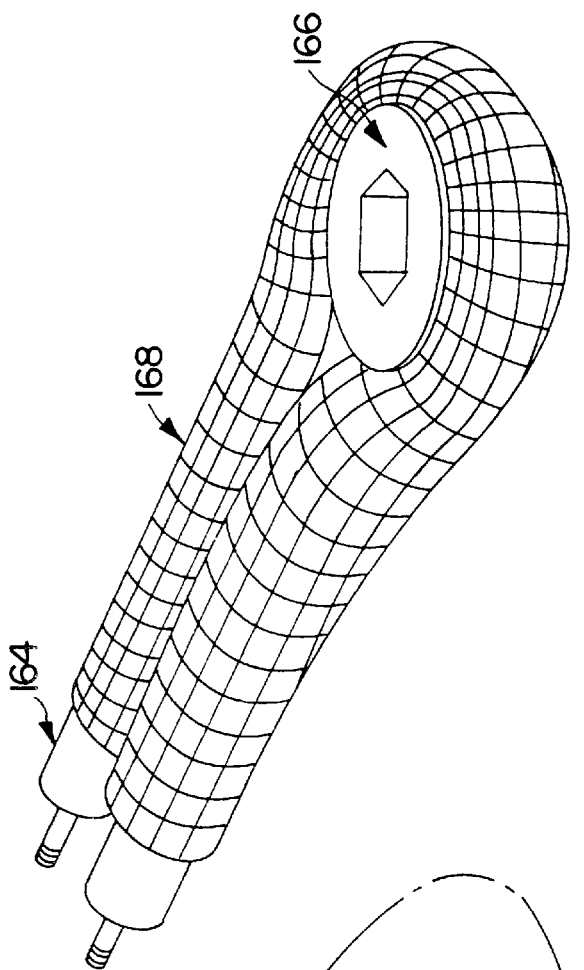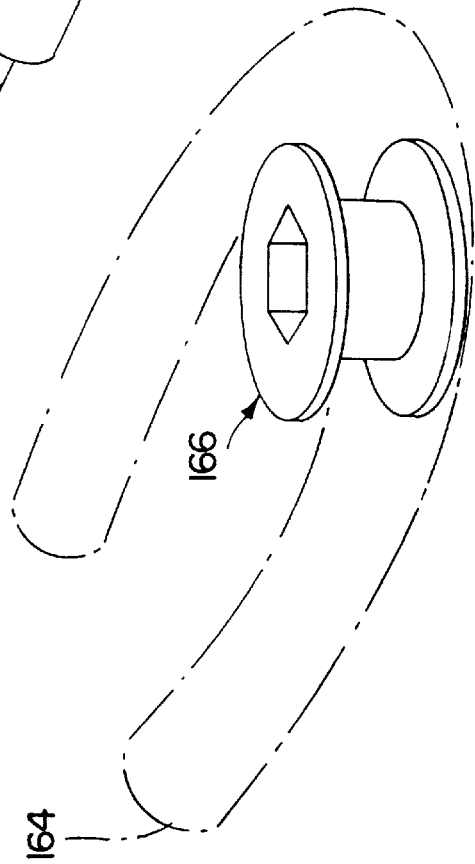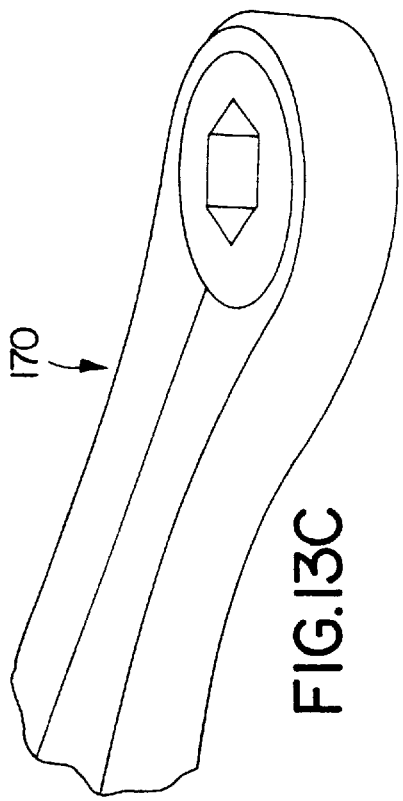

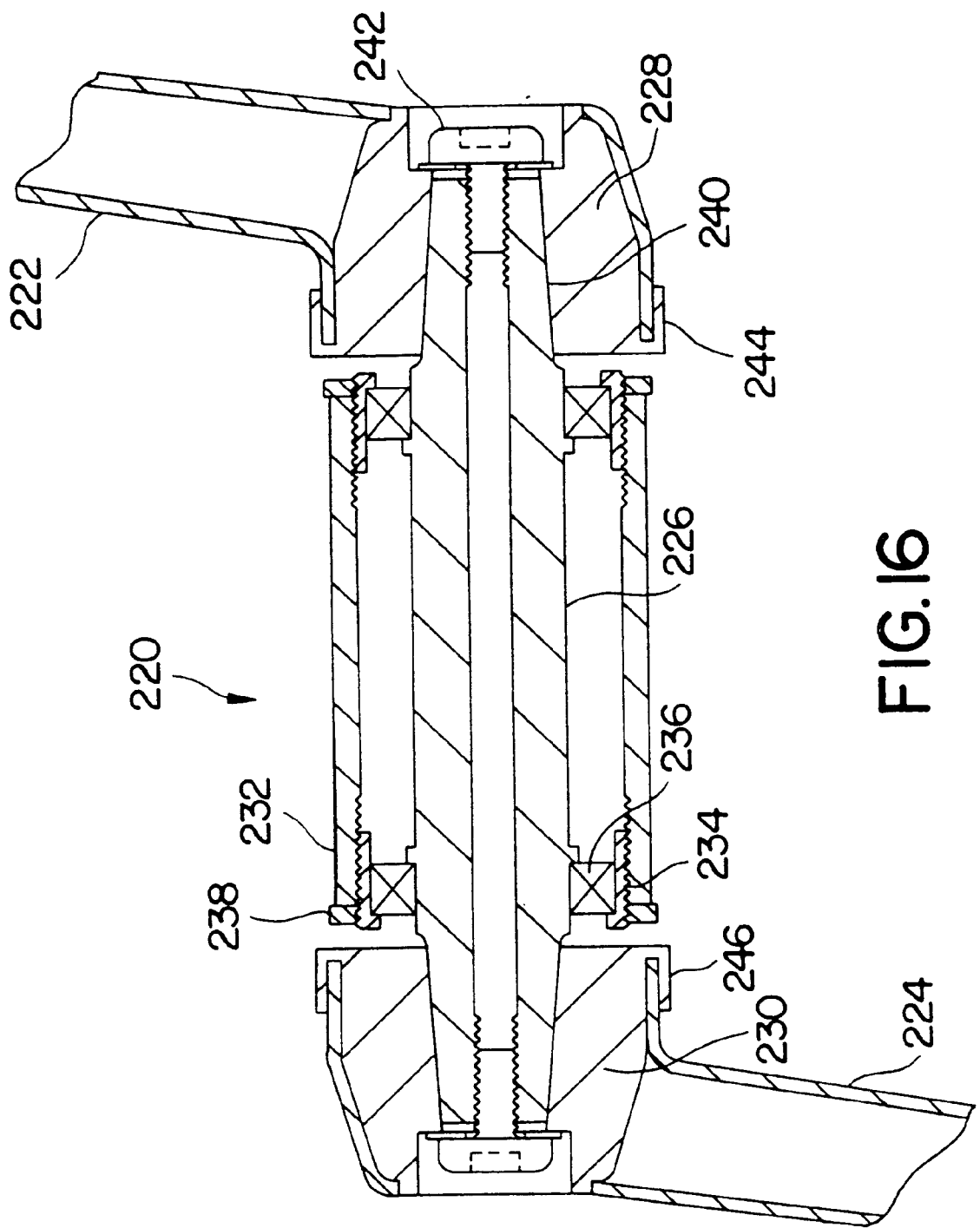

BICYCLE CRANKSHAFT ASSEMBLY

BACKGROUND OF THE INVENTION

1. Field of the Invention

This invention relates to bicycle crankshaft assemblies designed to be light in weight while maintaining good structural strength and stiffness, with cost effective manufacturing and at reasonable cost, while permitting simple assembly and installation.

2. Description of the Prior Art

In recent years bicycles have made a significant comeback and are used extensively by a large number of people both for pleasure and in competition.

It is highly desirable to make the bicycle lighter in weight while at the same time achieving good structural strength. This provides the user with a considerable advantage, especially in a competitive situation.

A common part of the bicycle is the crankshaft assembly which includes a central crank axle and crank arms affixed to the outer ends of the crank axle. Connected to the outer ends of each crank arm is the bicycle pedal which is used by the rider to apply motive force to the bicycle.

It is naturally highly desirable to provide a strong, light weight crank shaft assembly, but this is difficult to accomplish in view of the large amount of stress placed on the assembly with repeated cyclic loading.

Efforts have been made to provide such strong, light weight crankshaft assemblies, such as in the following U.S. Pat. Nos. 4,811,626, 5,010,785, 2,350,468, 602,049, 4,704,919, 4,171,822, 3,906,811 and 5,493,937.

However, these have one or more shortcomings.

It is, therefore, desirable to provide an improved crankshaft assembly having light weight while maintaining good structural strength and stiffness.

SUMMARY OF THE INVENTION

It is, therefore, a principal object of the present invention to provide an improved bicycle crankshaft assembly which is light in weight while maintaining good structural strength and stiffness.

It is a further object of the present invention to provide an improved bicycle crankshaft assembly as aforesaid which can be made with cost effective manufacturing processes, resulting in competitive retail prices.

It is a still further object of the present invention to provide an improved bicycle crankshaft assembly as aforesaid which is reasonably simple to assemble and install.

It is an additional object of the present invention to provide an improved bicycle crankshaft assembly as aforesaid which is compatible with existing bicycle frames and components.

It is a further object of the present invention to provide an improved bicycle crankshaft assembly which achieves additional desirable performance features, such as increased stiffness, reduced friction and lower aerodynamic drag.

In accordance with the present invention it has been found that the foregoing objects and advantages are readily obtained and an improved bicycle crankshaft assembly provided. The improved assembly of the present invention includes two crank arms having end portions thereof, a crank axle having two end portions thereof, with one of said crank arms attached to one of said axle end portions and the other of said crank arms attached to the other of said axle end portions, and a crank arm insert affixed to at least one of said axle end portions and also affixed to one of said crank arms end portions for connection of said crank arm to said crank axle. Desirably, two crank arm inserts are provided, one of which is affixed to one of said axle end portions and also affixed to one of said crank arm end portions, and a second of which is affixed to the other of said axle end portions and also affixed to the other of said crank arm end portions.

Further features and advantages of the present invention will appear hereinbelow.

BRIEF DESCRIPTION OF THE DRAWINGS

The present invention will be more readily understandable from a consideration of the accompanying drawings in which:

FIGS. 1A, 1B and 1C are partial sectional views of crank arm-insert assemblies of the present invention;

FIGS. 5A, 5B and 5C are partial sectional views of additional embodiments of crank arm-insert assemblies of the present invention;

FIGS. 6A and 6B are partial sectional and side views, respectively, showing a crank arm-insert assembly of the present invention as in FIG. 5A including a spider or chainwheel continuous with or attached to the insert;

FIGS. 7A and 7B are partial sectional and side views, respectively, similar to FIGS. 6A and 6B showing an alternate embodiment;

FIGS. 8A and 8B are partial perspective views showing an alternate embodiment of a crank arm-insert assembly of the present invention in the unassembled and assembled condition;

FIGS. 13A, 13B and 13C show a crank arm-insert assembly similar to FIG. 1A in various stages of manufacture;

FIG. 16 is a partial sectional view of a crankshaft assembly of the present invention;

DETAILED DESCRIPTION OF PREFERRED EMBODIMENTS

Figure 2B:
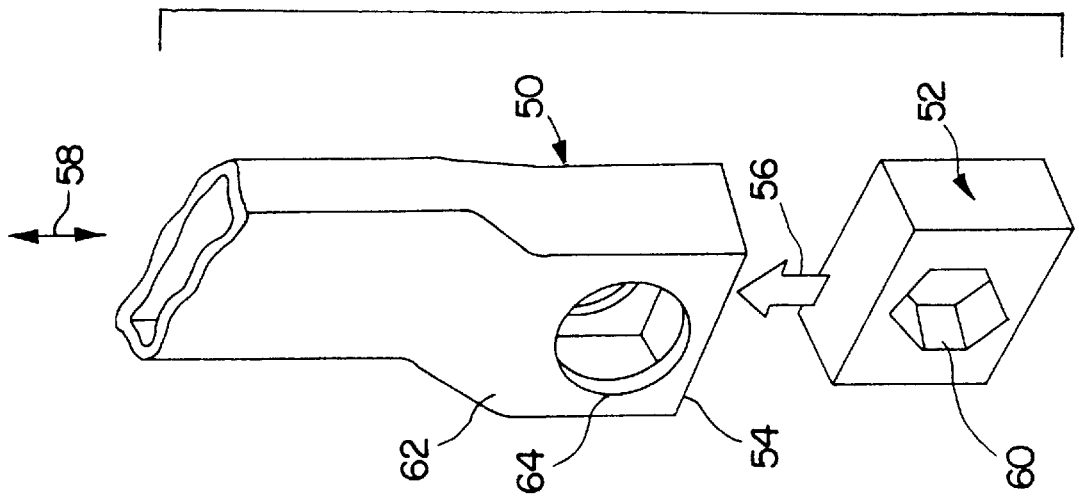
FIGS. 2A and 2B are partial perspective views showing alternate embodiments of crank arm-insert assemblies of the present invention.

Referring to the drawings, FIG. 1A shows crank arm 10 and insert 12 integrally affixed thereto at the crank arm end and desirably bonded thereto. The tubular crank arm 10 is formed from one or two parallel tubular elements 14 and 16 which wrap around insert 12 and thus provide the insert as a reinforcement at the end of the crank arm. The embodiment of FIG. 1A shows two separate tubular elements 14 and 16 bonded together at end portion 15 of crank arm 10. The insert 12 includes means for mounting the crank axle, as hexagonal inner walls 18. If desired, and advantageously the insert could also be situated at the pedal end including means for mounting the pedal and thus providing the reinforcing insert integrally affixed to both ends of the crank arm. This enables a firm and solid connection between the crank axle and crank arm, and also if used between the crank arm and pedal.

FIG. 1B shows a sleeve approach where tubular crank arm 20 is fitted to a sleeve-like insert 22 which mates with and is desirably bonded to the external surface 24 of crank arm 20 at the end portion thereof. Insert 22 includes means 26 for mounting the crank axle offset from the central axis 28 of the crank arm. Naturally, hereagain as with all embodiments of the present invention, insert 22 may be provided at the pedal end as well as at the axle end and hereagain creates a solid connection with the crank arm.

Throughout the present specification the insert is integrally affixed by bonding, as with the use of adhesive; however, it should be understood that one may readily employ fasteners or some other type of mechanical engagement as a substitute for or reinforcement of the bonded assembly procedure. Also, the tubular crank arms herein are generally hollow; however, the hollow portion may readily be filled in, as with a lower density material such as a foam, etc. Also, the insert designs may readily be used with a solid crank arm where a solid end is adapted to fit the insert. In the case of a sleeve-type insert, a connection to a solid crank arm is straight-forward. In the case of a plug-type insert the end of the solid arm must be hollowed out to accept the insert.

FIG. 1C shows crank arm 30 with an open end portion 31 and insert 32 where the insert is a reinforcement plug fitted to inside surface 34 of tubular crank arm 30 at the open end portion 31 thereof and preferably bonded thereto. Insert 32 also includes means 36 for mounting the crank axle and provides a solid connection therebetween.

Figure 2A:
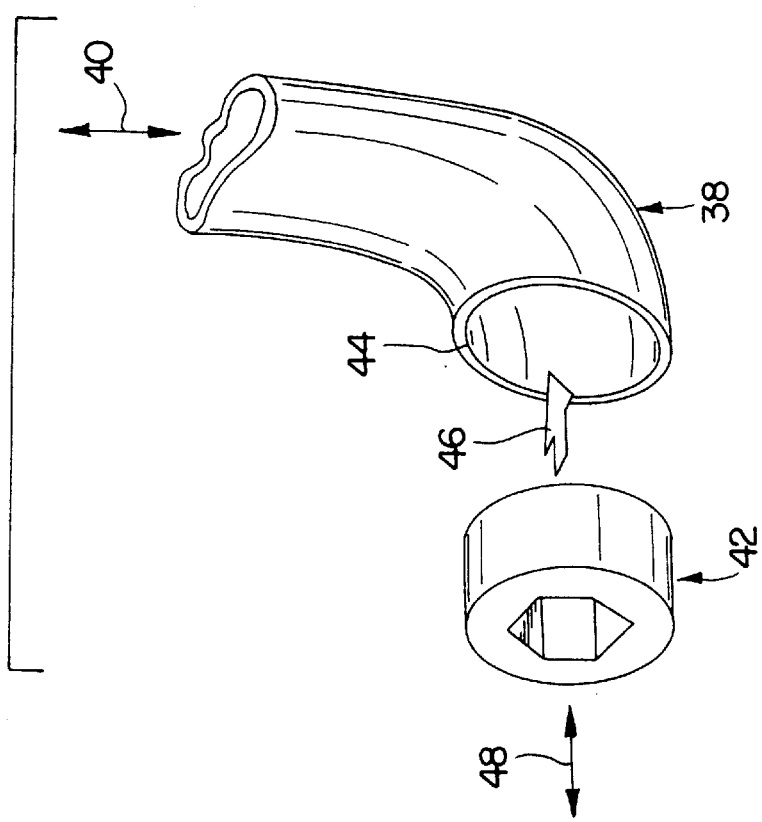

FIG. 2A shows tubular crank arm 38 having a crank arm axis 40 and insert plug 42 fitted into open end 44 of crank arm 38 in the direction of arrow 46 and in a direction generally parallel to crank axle longitudinal axis 48 and desirably bonded thereto. The sleeve approach shown for example in FIG. 1B could readily be used in this embodiment. The insert plug 42 serves to provide structural reinforcement and a solid connection point to the crank arm.

FIG. 2B shows crank arm 50 and insert 52, with insert 52 fitted into open end 54 of crank arm 50 in the direction of arrow 56 and in a direction generally parallel to crank arm longitudinal axis 58. Insert 52 as with the other embodiments includes means 60 for creating a solid connection to the crank axle, and external wall 62 of crank arm 50 includes opening 64 permitting the crank axle to pass through the crank arm for engagement with connection means 60.

Figure 3B:
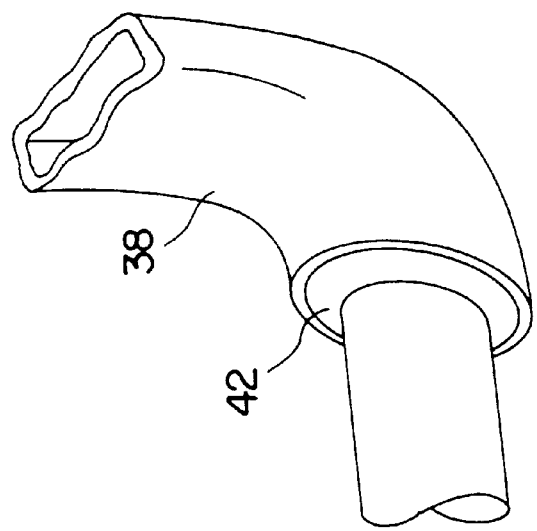
FIGS. 3A and 3B are partial perspective views showing a further embodiment of a crank arm-insert axle assembly of the present invention similar to FIG. 2A in the unassembled and assembled condition.
Figure 3A:
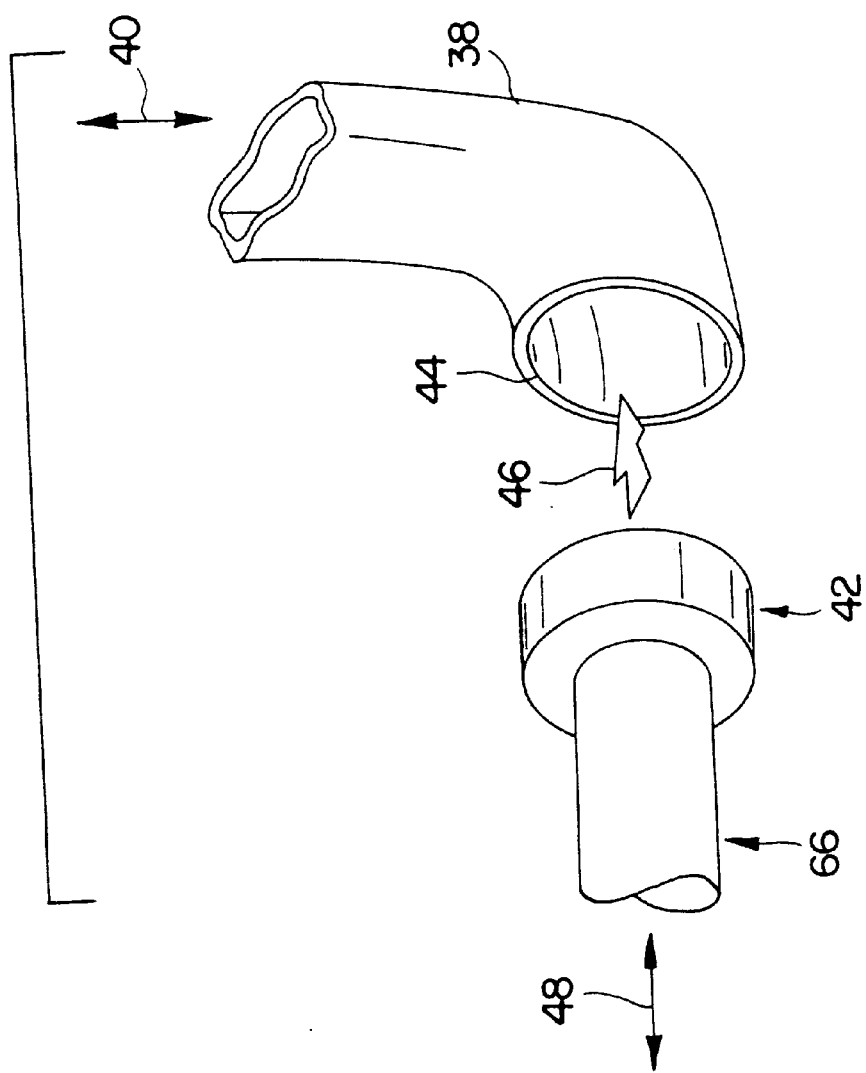

FIGS. 3A and 3B are similar to FIG. 2A showing crank arm 38 having crank arm axis 40 and insert 42 fitted into open end 44 of crank arm 38 in the direction of arrow 46 and in a direction generally parallel to crank axle axis 48 and desirably bonded thereto as with the other embodiments of the present invention. However, in this embodiment, the crank arm insert 42 and crank axle 66 are integrally connected to one another as a one-piece single component providing a reinforced connection. FIG. 3B shows the components of FIG. 3A in the assembled condition.

Figure 4B:
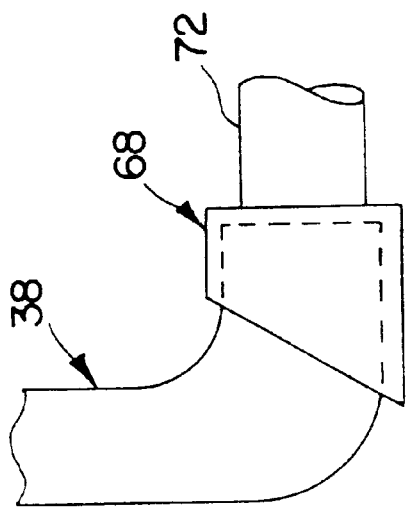
FIGS. 4A and 4B are partial perspective views showing a still further embodiment of a crank arm-insert-axle assembly of the present invention in the unassembled and assembled condition.
Figure 4A:
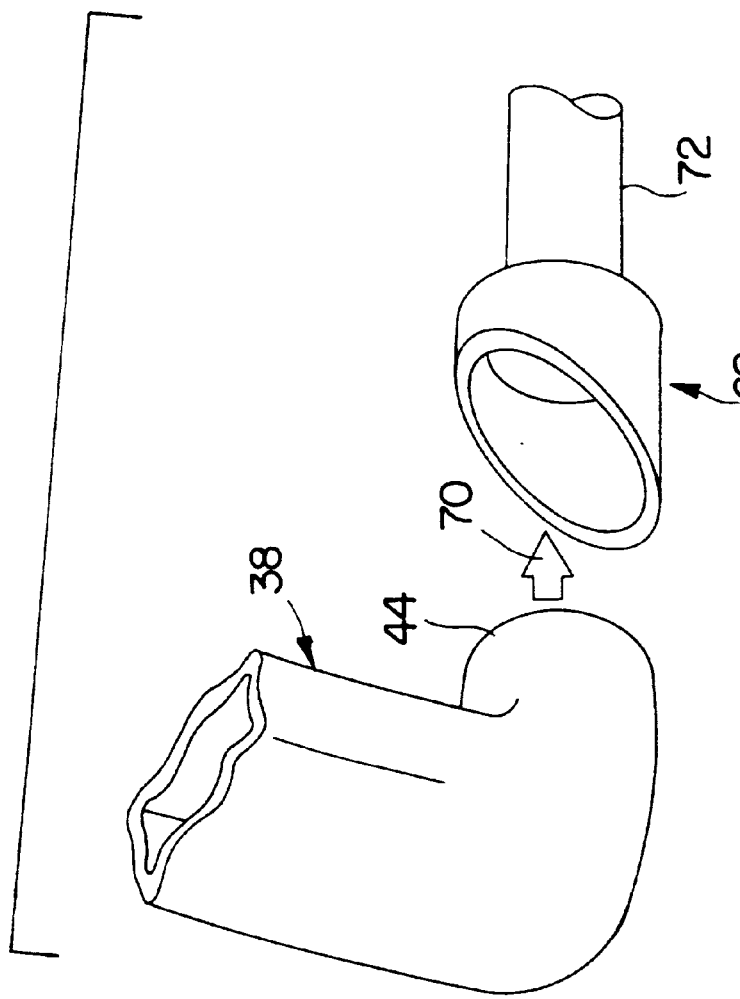

FIGS. 4A and 4B are similar to FIGS. 3A and 3B using the sleeve approach. Hereagain, tubular crank arm 38 has open end 44. Sleeve-like insert 68 is fitted over open end 44 in the direction of arrow 70 with crank axle 72 integrally connected to sleeve 68 as a single component. FIG. 4B shows the assembled components.

FIGS. 5A, 5B and 5C show various interface geometries between the tubular crank arm and the insert where the insert is a plug inserted in the open end of the crank arm in a direction generally parallel to the axis of the crank axle. These embodiments show the optimization of the interface geometry between the crank arm and insert plug to enhance the connection between these two elements.

FIG. 5A shows crank arm 74 and insert 76 fitted into open end 78 of arm 74 wherein the outside surface 80 of insert 76 is bonded to inside surface 82 of crank arm 74. FIG. 5B includes inwardly extending flanges 84 extending towards open end 78 of arm 74, with insert 76 engaging and bonded to said flanges. Insert 76 includes outside flanges 86 which overlaps outside surface 88 of crank arm 74. Thus, the insert overlaps inside and outside surfaces of the crank arm as well as surrounding internal flanges of the crank arm for increased bonding surface area. FIG. 5C includes an additional insert 90 bonded to flanges 84 and extending towards open end 78 of crank arm 74 and also bonded to insert 76 to reinforce the plug insert 76. This provides increased surface area overlap for enhanced bond performance.

FIGS. 6A and 6B show an embodiment similar to FIG. 5A where insert 92 is integral with spider 94, with insert 92 including means for retaining the spider 94 thereon, as outwardly extending flange 93. The spider or chainwheel is the component which mounts the chainspockets or chainwheels. This provides a firmly engaged, strong assembly. FIGS. 7A and 7B are similar to FIGS. 6A and 6B wherein the crank arm 74 includes an annular flange 98 engaging and bonded to annular flange 100 of insert 92, with spider 94 mounted on and integral with flange 100 and extending therefrom, providing increased bonding surface area and reinforcement of annular flange 100.

FIGS. 8A and 8B show a tubular crank arm 102 with enlarged end portion 104 having opening 105 therein and insert 106 including means 108 for engagement with an axle.

The insert is of generally circular configuration and is fitted in the direction of arrow 107 inside opening 105 of enlarged end portion 104. This type of arrangement has obvious advantages from a manufacturing and assembling point of view, for example, the insert may now be turned on a lathe. Crank arm 102 includes openings 110, 112 in enlarged end portion 104 for engagement with axle engagement means 108 and also to provide access for the crank axle to engage with the insert. It can be readily seen in accordance with FIGS. 8A and 8B that the tubular crank arm is bulged or has a discontinuous cross-sectional geometry which is intended to conform to the insert. Thus, the tubular crank arm is not simply a constant cross-section tube with a plug at least at one end thereof. Nor is it even a tube with an evenly tapering cross-section. The tubular crank arm in FIGS. 8A and 8B includes an abrupt change in cross-section in the region of the insert. This discontinuous cross-section provides increased mating contact area between the insert and crank arm, thereby optimizing the interface geometry.

Figure 9A:
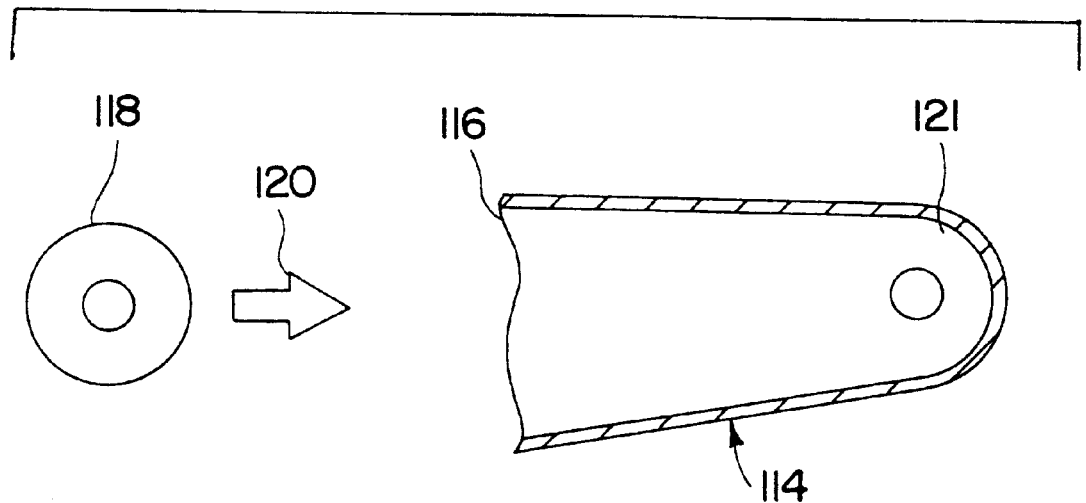
FIGS. 9A and 9B are partial sectional views showing a further embodiment of a crank arm-insert assembly of the present invention in the unassembled and assembled condition.
Figure 9B:
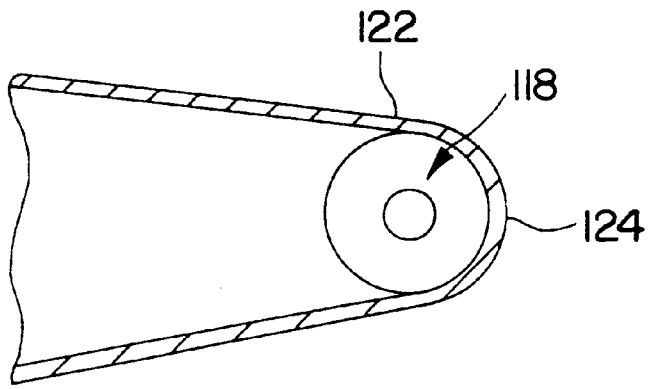
Figure 9C:
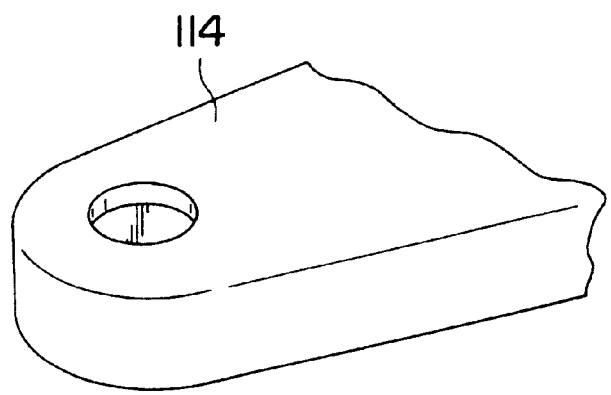
FIG. 9C is a partial perspective view showing the assembled crank arm-insert assembly of FIG. 9B, and FIGS. 9D and 9E show alternate embodiments.

FIGS. 9A, 9B and 9C show tubular crank arm 114 having an opening 116 at one end and a generally circular insert 118 introduced into the opening in the direction of arrow 120. The insert plug 118 passes through the length of crank arm 114 and is bonded or affixed to the crank arm at the location 121 opposed to opening 116. In this embodiment, location 120 contains a constricted end region 122 which may have a closed portion thereof 124.

Naturally, the insert 118 may be non-circular and have any desired shape, such as for example, oval, rectangular, square, triangular or generally annular.

Figure 9D:
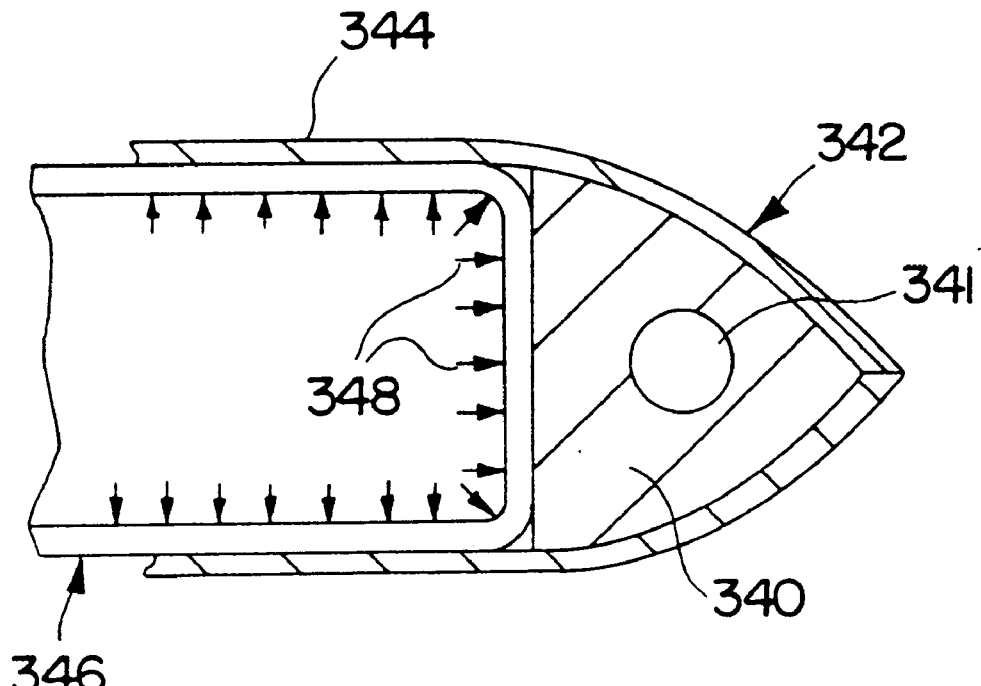
Figure 9E:
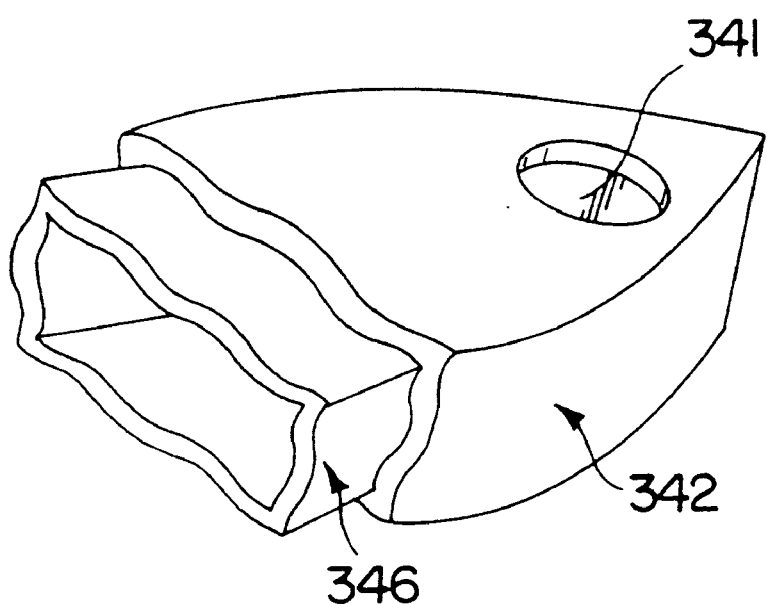

Thus, FIGS. 9D and 9E illustrate the use of a non-circular insert, as generally triangular insert 340, including means 341 for engagement with an axle, introduced into end region 342 of crank arm 344. Bladder 346 presses on insert 340 via internal pressure applied at arrows 348, forcing the insert against the inner walls of the tubular crank arm. The bladder may if desired be subsequently removed. The tubular crank arm is necked-down or fully closed off in this region and the pressure of the insert against the inner walls serves to provide the desirable compression of the material during the molding process. Thus, this embodiment illustrates a bladder molding process where the bladder provides pressure to the material via the insert. In the case where the tubular crank arm is already a pre-cured part, an internal bladder may still be used to provide pressure at the bonding interface between the insert and the tubular crank arm.

Figure 10A:
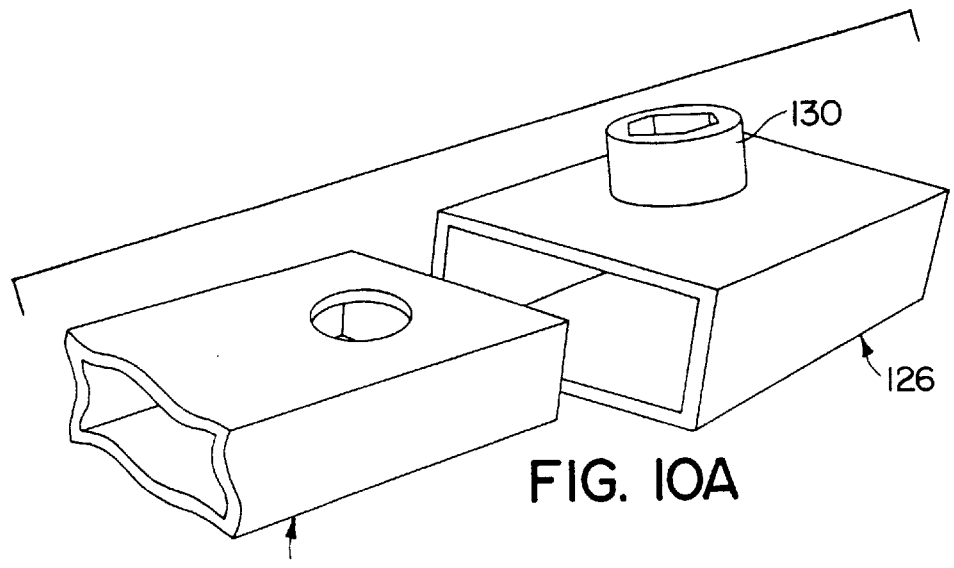
FIGS. 10A and 10B are partial perspective and sectional views, respectively, showing an alternate embodiment of a crank arm-insert assembly of the present invention in the unassembled and assembled condition.
Figure 10B:
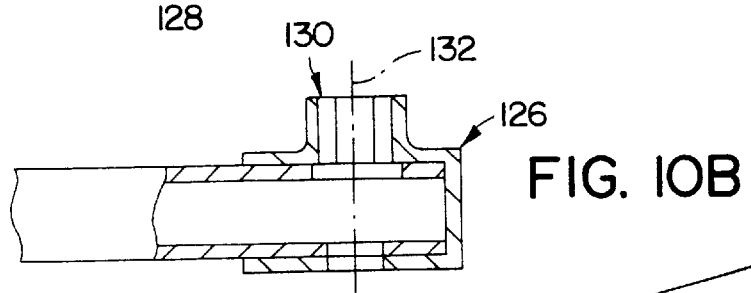
Figure 10C:
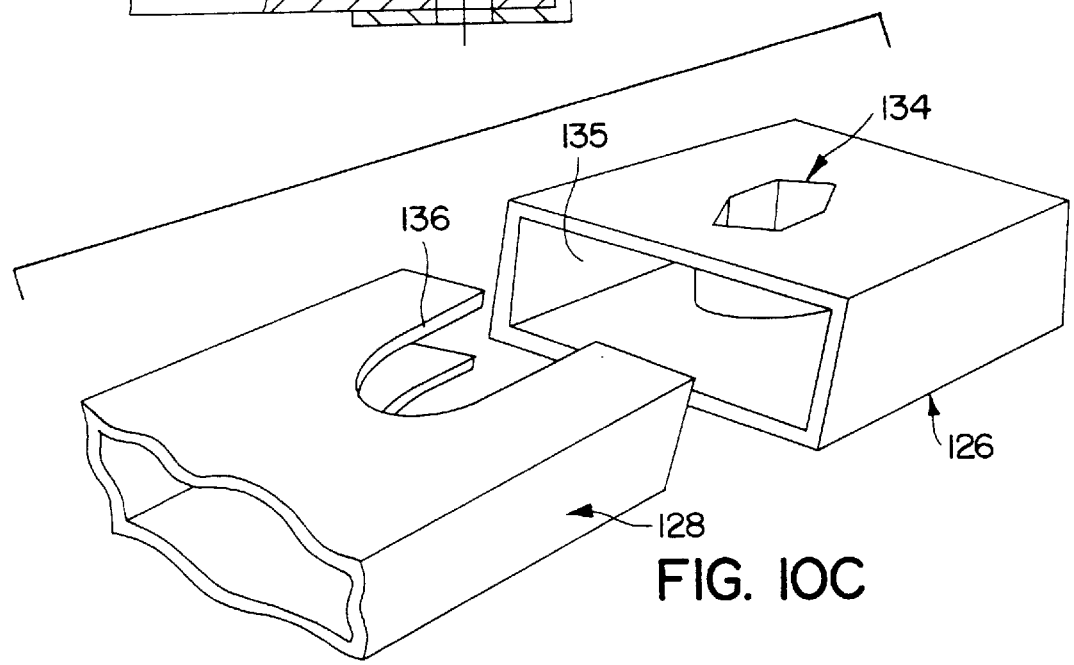
FIGS. 10C and 10D are views similar to FIGS. 10A and 10B showing an alternate embodiment.
Figure 10D:
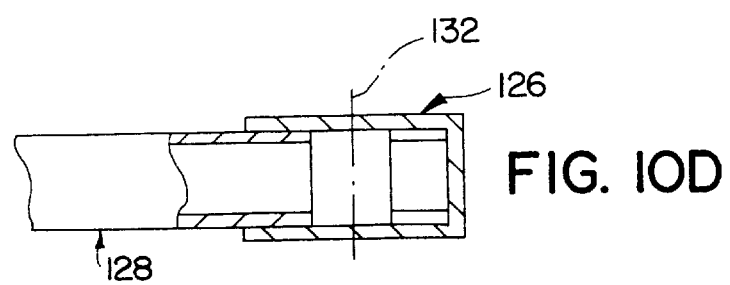

FIGS. 10A, 10B, 10C and 10D show insert 126 as a sleeve which fits over crank arm 128. In the embodiment of FIGS. 10A and 10B a crank axle attachment boss 130 is fitted to one side of insert 126. The crank axle centerline 132 may pass through the tubular crank arm 128. Note that boss 130 does not necessarily protrude into the interior of insert sleeve 126 and the boss may be used as a part of the crank axle, if desired, where the crank bearings may be fitted to the outside diameter of the boss. FIGS. 10C and 10D show the crank axle attachment means 134 of sleeve 126 protruding into the internal cavity 135 of sleeve 126 so that the tubular crank arm 128 must include notch 136 to fit around the axle attachment means. Here also the crank axle centerline 132 passes through the tubular crank arm 128.

Figure 11:
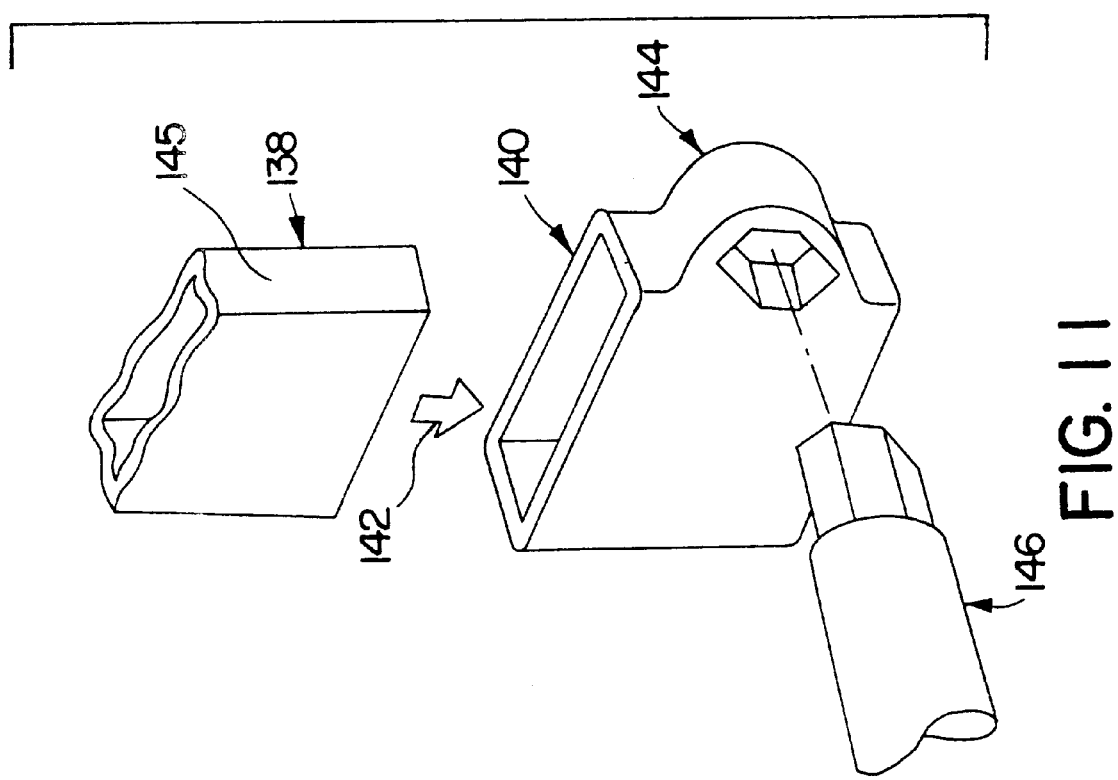
FIG. 11 is a partial perspective view showing an alternate embodiment of a crank arm-insert-axle assembly of the present invention in the unassembled condition.

FIG. 11 is similar to the embodiment of FIG. 1B with tubular crank arm 138 inserted into insert sleeve 140 in the direction of arrow 142. Crank axle attachment means 144 of insert 140 is offset from the central axis of both the crank arm and insert so that crank axle 146 is outside exterior surface 148 of crank arm 138.

Figure 12:
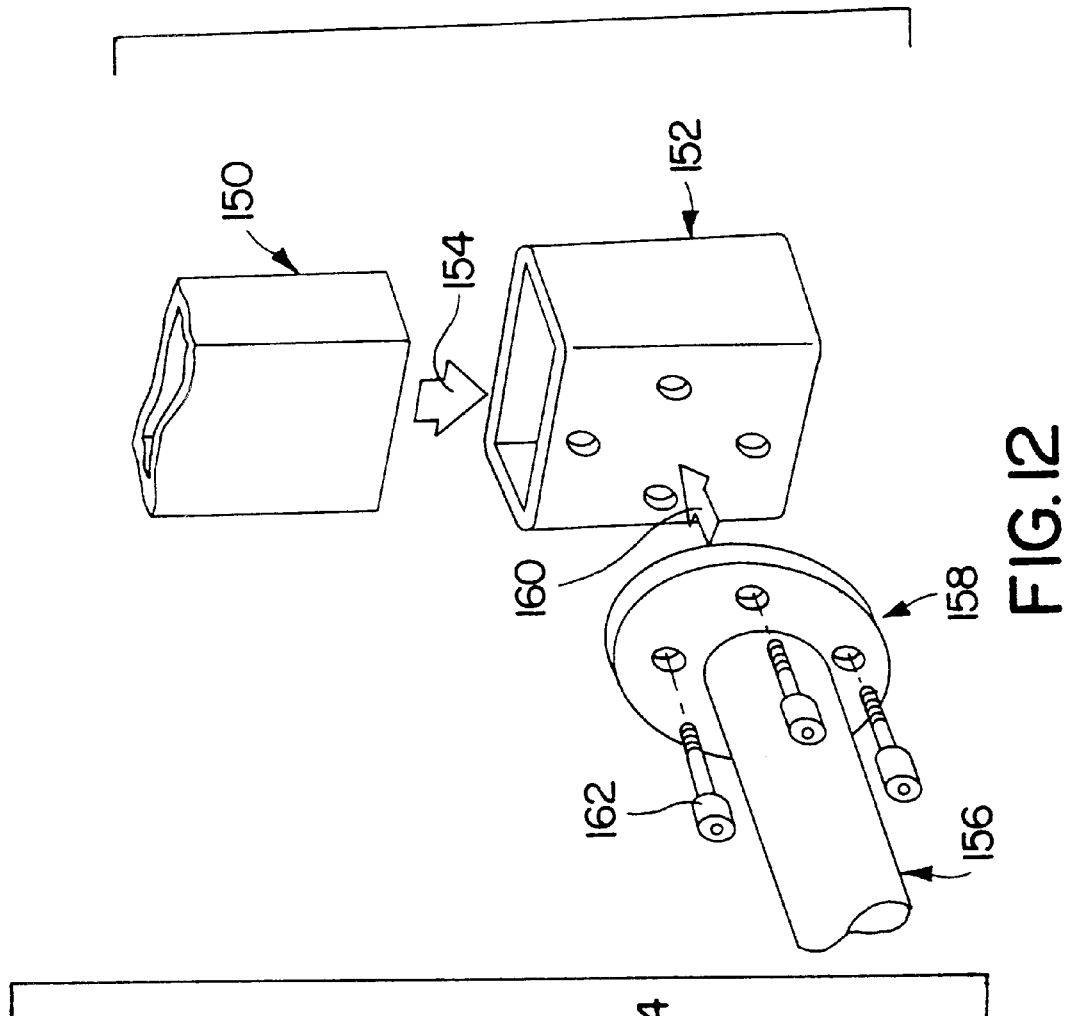
FIG. 12 is a partial perspective view similar to FIG. 11 showing a still further embodiment.

FIG. 12 shows a tubular crank arm 150 and an insert sleeve 152, with the crank arm fitted into the insert sleeve in the direction of arrow 154 and desirably bonded therein as with the other embodiments. Crank axle 156 includes a mounting flange 158 which bolts to sleeve 152 in the direction of arrow 160 as via bolts 162. The flange connection of FIG. 12 is readily applicable to the insert-plug connection, for example as shown in FIG. 1C, as well as to other embodiments of the present invention, as for example FIG. 1A.

FIGS. 13A, 13B and 13C show the general manufacturing process which may be employed in the wrapped insert approach shown in FIG. 1A. An elastomeric bladder 164 is wrapped with prepreg composite material 168 (a fibrous sheet that is preimpregnated with uncured resin). The wrapped bladder is then bent into the shape of the letter U and an insert 166 is placed at the base of the U with the bladder wrapped therearound as shown in FIG. 13A. The wrapped bladder is wrapped tightly around insert 166, as shown in FIG. 13B, and this assembly is placed in a female mold. During molding the bladder is inflated with pneumatic pressure and the mold is heated so that the resin cures while the prepreg is under pressure. Upon demolding, a fully cured and consolidated part 170 is obtained as shown in FIG. 13C. The insert 166 is now fully captured and surrounded by the composite material. It is optional to remove the bladder prior to use.

Naturally, numerous variations of the foregoing procedure may be used for preparing a crank arm or crank axle. Thus, for example, a prepreg plastic sheet including fibers therein similar to composite sleeve 168, may be wrapped around an elastomeric bladder. The wrapped bladder becomes the molding charge. The molding charge is place within a mold cavity of a mold with the mold cavity having the desired shape. Pressurized air is introduced into the bladder and heat is applied to the mold to conform the prepreg (which is in the form of a sleeve) to the cavity, to densify or consolidate same and to cure the part which now has the desired shape, as for example, a hollow, rectangular or annular part which is particularly desirable as a crank arm or crank axle. The bladder may if desired be removed from the cured part, although this is not essential.

Figure 14A:
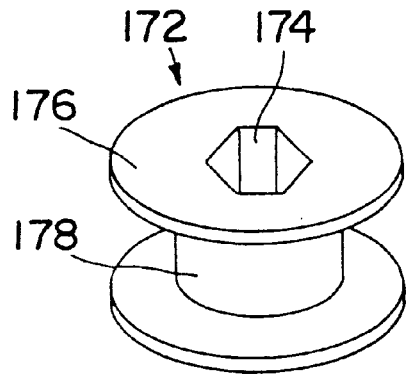
FIGS. 14A, 14B and 14C are perspective views of various representative inserts usable in the procedure shown in FIGS. 13A, 13B and 13C.
Figure 14B:
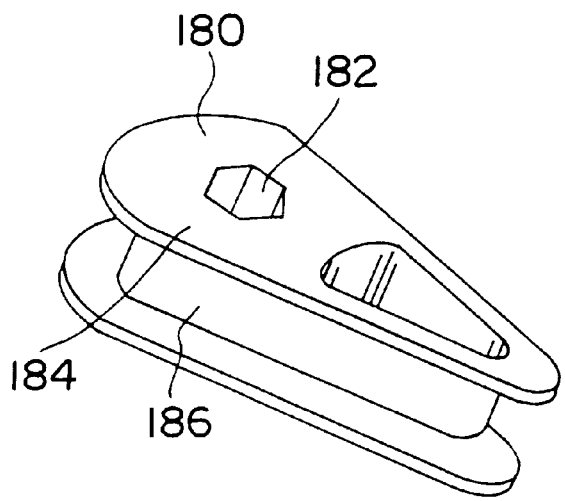
Figure 14C:
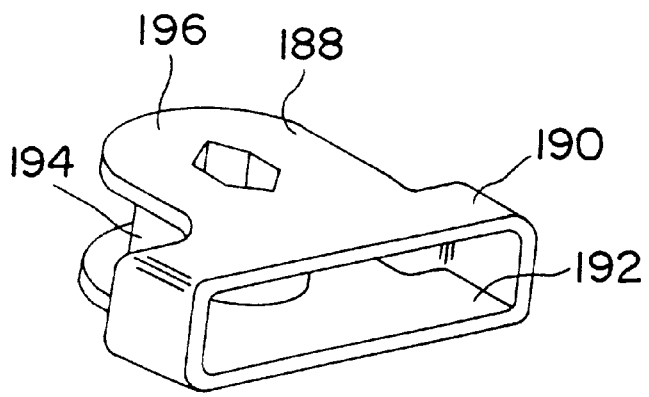

FIGS. 14A, 14B and 14C show representatively insert geometries which may be used in the tubular wrap approach shown in FIGS. 13A, 13B and 13C. FIG. 14A shows insert 172 in the form of an annular bobbin having a central orifice 174 as a means for engagement with the crank axle, plus annular external flanges 176 defining an annular recess 178. FIG. 14B shows insert 180 in the form of an elongated, teardrop shaped bobbin with central orifice 182 as a means for engagement with the crank axle. Insert 180 also includes annular external flanges 184 defining an annular recess 186. The teardrop shape allows for a more gentle reverse bend of the crank arm tube as well as providing spaced alignment of the crank arm tubes for greater structural strength and stiffness of the crank arm. FIG. 14C shows an insert 188 which wraps around the outer surfaces of the crank arm tubes. Insert 188 is in the shape of an annular bobbin with a depending flange 190 defining an internal passageway 192 communicating with annular recess 194 defined by external flanges 196.

Figure 15A:
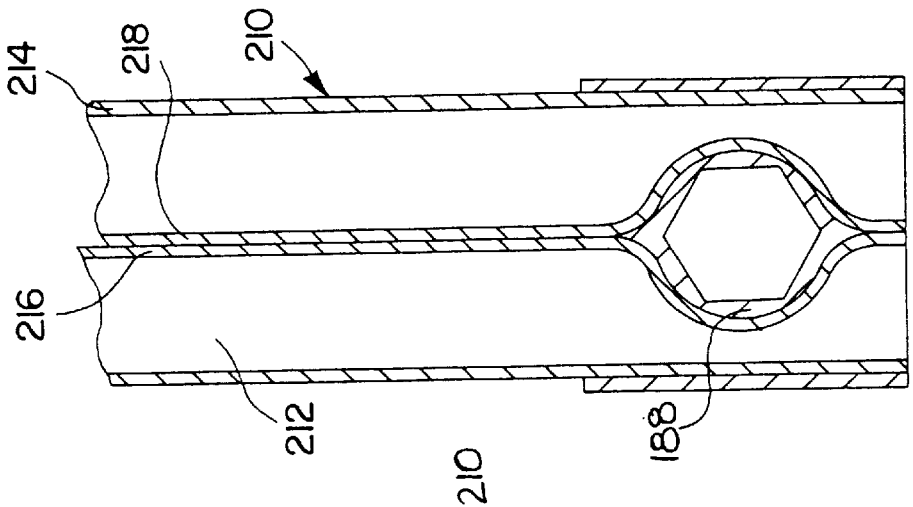
FIGS. 15A, 15B, 15C and 15D are partial sectional views of crank arm-insert assemblies of the present invention using inserts similar to those shown in FIGS. 14A, 14B and 14C.
Figure 15B:
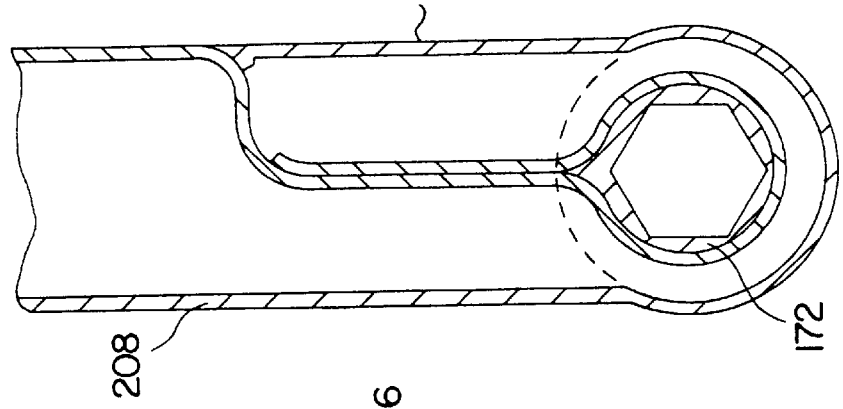
Figure 15C:
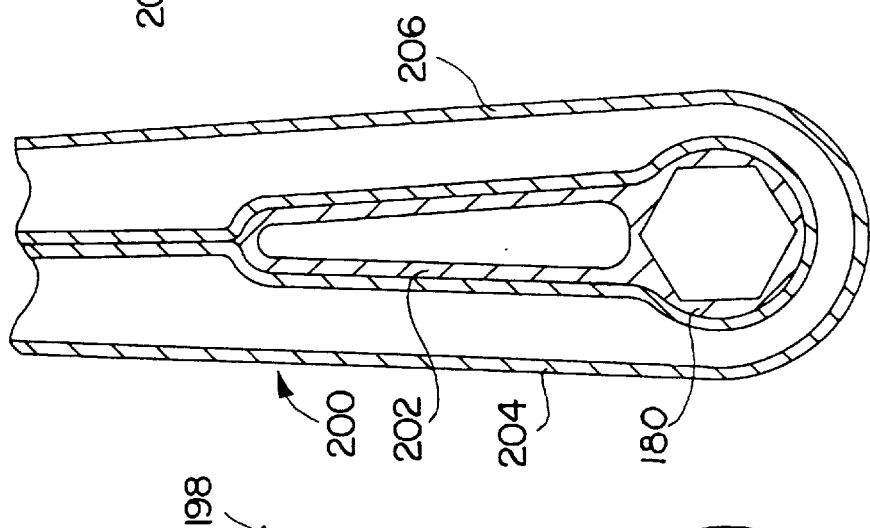
Figure 15D:
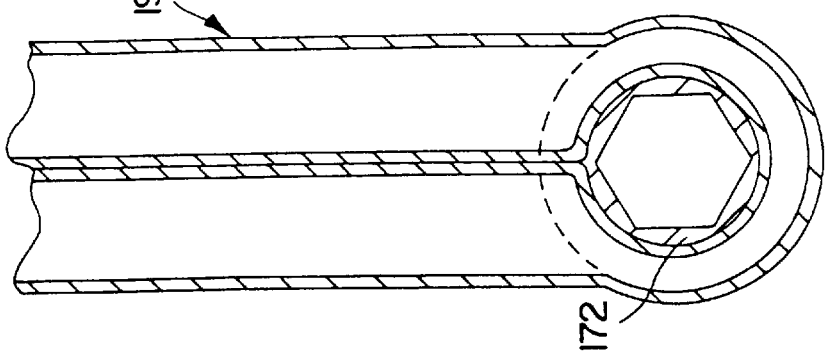

FIGS. 15A, 15B 15C and 15D show different embodiments which can be used in the wrap approach. FIG. 15A is similar to FIG. 1A using insert 172 from FIG. 14A, except that a single tubular crank arm 198 is wrapped around insert 172. FIG. 15B uses insert 180 from FIG. 14B, also wrapping a single tubular crank arm 200 around insert 180. Insert 180 includes an outwardly extending portion 202 which acts as a spacer between legs 204, 206 of the U-shaped crank arm. FIG. 15C uses insert 172 from FIG. 14A where crank arm tube 208 wraps around insert 172 and includes an upwardly extending portion 209 which terminates along the length of the crank arm. FIG. 15D uses an insert 188 similar to that shown in FIG. 14C. In addition, FIG. 15D shows a wrap approach where crank arm tube 210 includes two separate tube portions 212, 214 which are not connected at their ends, but are attached to each other at their sides 216 and 218.

FIG. 16 shows a crankshaft assembly 220 of the present invention including first crank arm 222 and second crank arm 224 affixed to crank axle 226 via inserts 228 and 230, respectively. Bottom bracket shell 232 surrounds axle 226 and holds bearing cups 234 and bearings 236 in place. Threaded lock ring 238 serves as a locknut to secure bearing cups 234 within the bottom bracket shell 232. Axle 226 has a tapered, square connection 240 which mates with inserts 228 and 230 and is secured to the inserts via fixing bolts 242. Note that inserts 228, 230 include external flanges 244 and 246, respectively, which wrap around their respective crank arms for a more secure engagement. The crank axle and bearing assembly is often referred to as a bottom bracket assembly.

Figure 17:
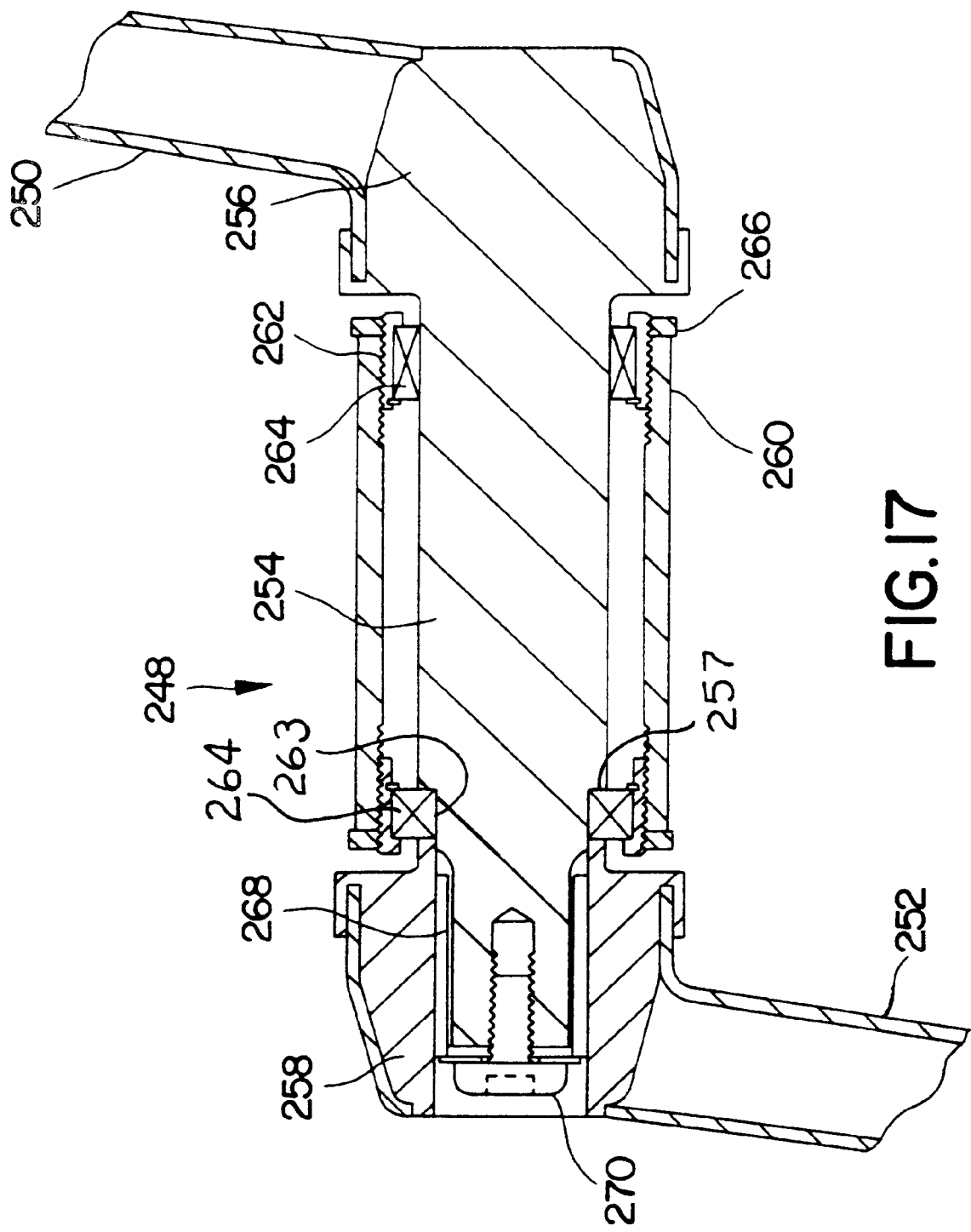
FIGS. 17–18 are partial sectional views showing alternate embodiments of a crankshaft assembly of the present invention.

FIG. 17 shows another embodiment of a crank shaft assembly 248 of the present invention including a first crank arm 250 and a second crank arm 252 affixed to crank axle 254 via inserts 256 and 258, respectively. It should be noted that one of the inserts, insert 256, is integral with and forms a single piece with crank axle 254. Bottom bracket shell 260 surrounds axle 254 and holds bearing cups 262 and bearings 264 in place. Threaded lock ring 266 serves as a locknut as in FIG. 16. Crank axle 254 includes a straight spline mating connection 268 with insert 258 and is secured to insert 258 via fixing bolt 270. Thus, FIG. 17 shows a crank axle which is integral with the insert of one of the crank arms. The axle is passed through the bearings of the bottom bracket assembly and adapted to connect with the opposite crank arm. This arrangement simplifies the entire assembly by eliminating one of the crank axle to insert connections. The crank fixing bolt also serves to retain the crank arm as well as to clamp the inner race 263 of the bearing between the crank arm and a shoulder 257 of the crank axle. The fact that the bearing is clamped is significant. By capturing the inner race of the bearing as shown in FIG. 17, any bearing clearance adjustment is no longer required. This is a significant benefit since conventional bottom bracket assemblies usually require tedious adjustment.

Figure 18:
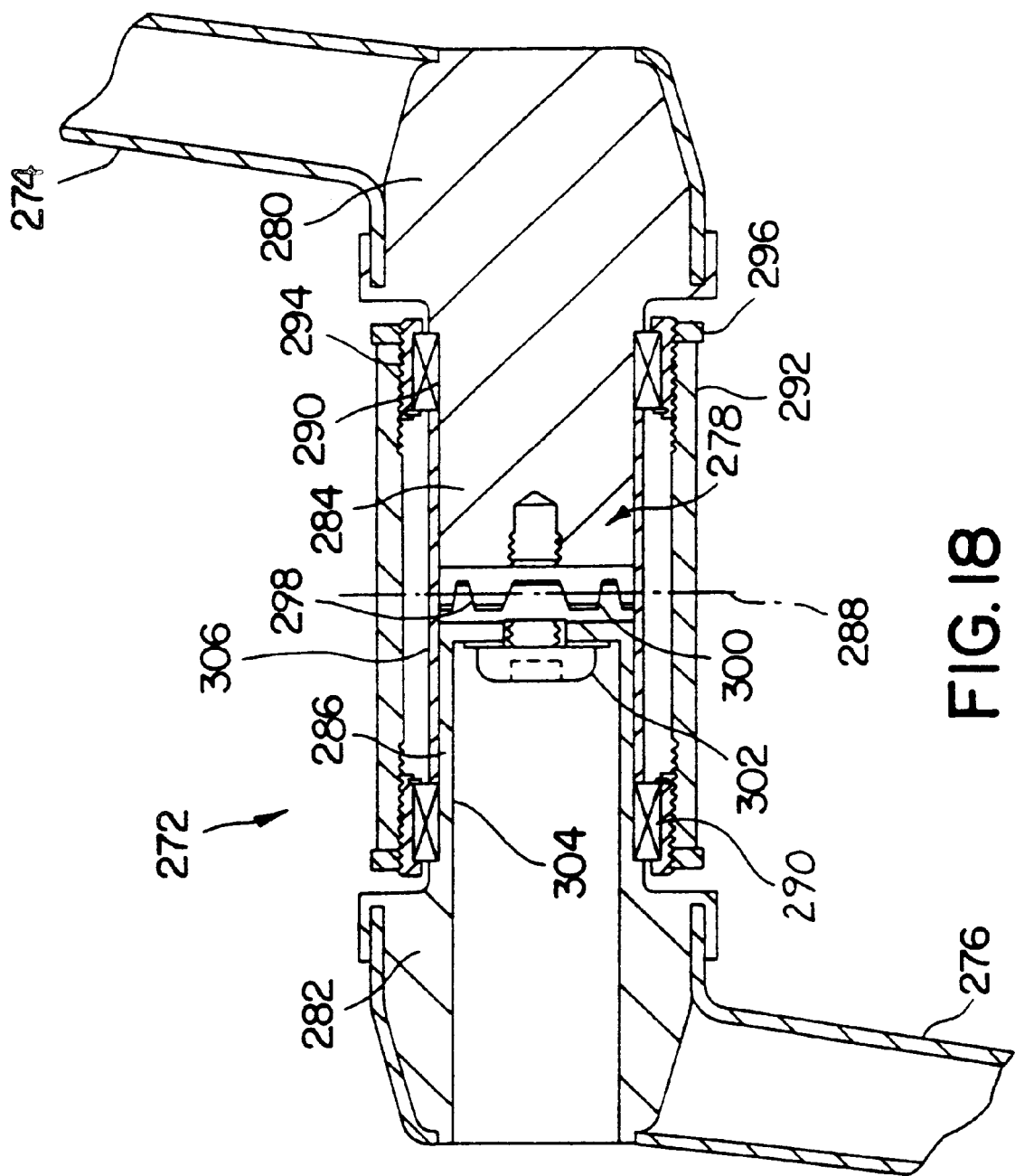

FIG. 18 shows another embodiment of a crankshaft assembly 272 of the present invention including a first crank arm 274 and a second crank arm 276 affixed to crank axle 278 via inserts 280, 282, respectively. Crank axle 278 is formed by two half axles, 284, 286 split generally across central axis 288 at a location approximately midway between bearings 290. As in FIGS. 16 and 17, bottom bracket shell 292 surrounds axle 278 and holds bearing cups 294 and the bearings 290 in place, with threaded lock ring 296 serving as a locknut. Crank axle half 284 is integral with and forms a single piece with insert 280 and is connected to first crank arm 274 via integral insert 280, and crank axle half 286 is integral with and forms a single piece with insert 282 and is connected to second crank arm 276 via integral insert 282. Torque is transmitted between the crank axle halves by way of interlocking face splines 298. Desirably, the face splines should have tapered teeth 300 in the axial direction with a geometry such that mating occurs on the tapered surfaces and allowing clearance between crest and peak of the spline as shown in FIG. 18. This allows the two crank axle halves to mate without any play or backlash. Fixing bolt 302 is also provided to securely engage the axle halves, with access to the axle central axis provided via channel 304 in axle half 286. Alignment sleeve 306 may optionally be provided to aid in aligning the axle halves.

Figure 19:
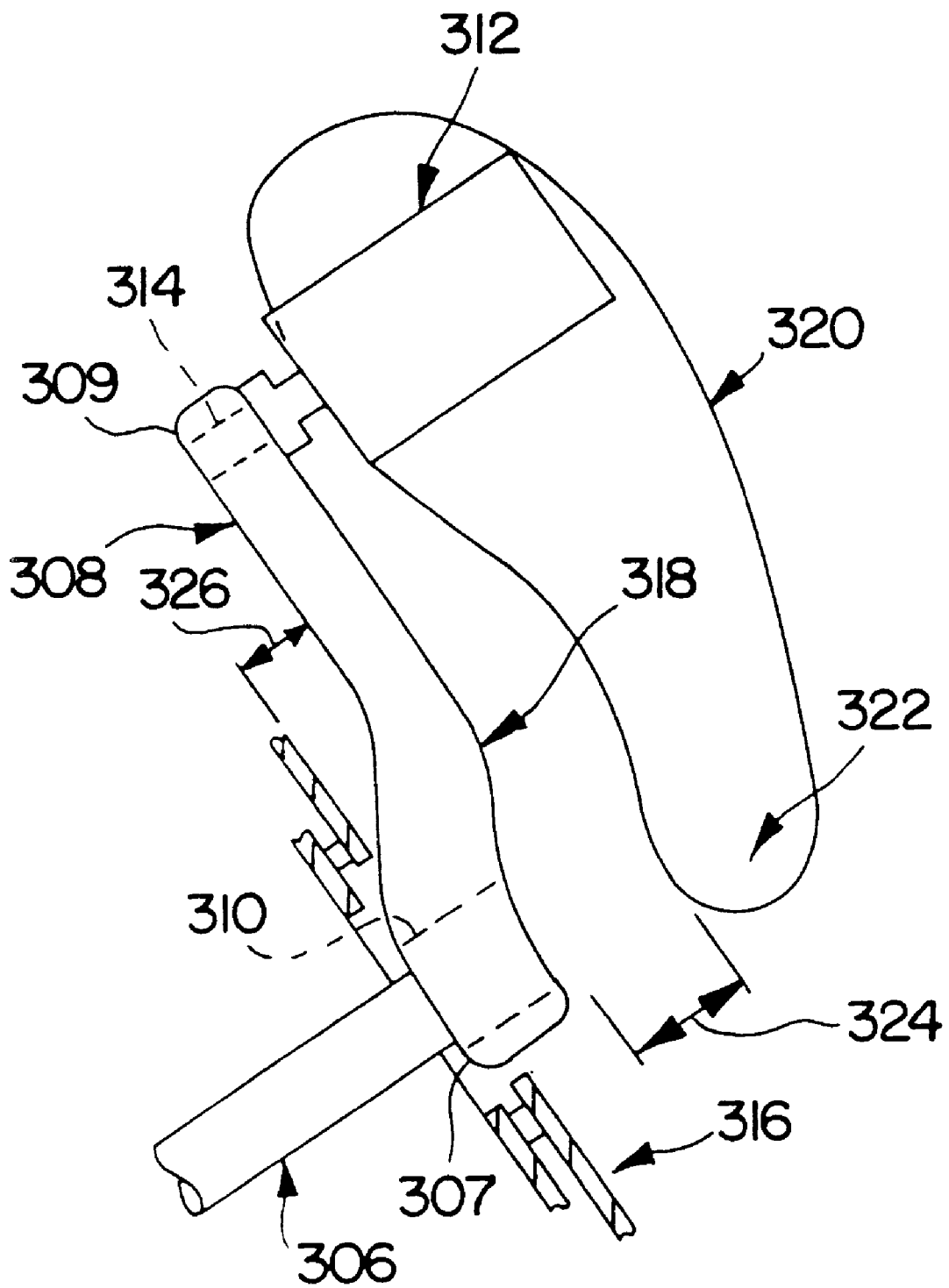
FIG. 19 is a partial top view of a crankshaft assembly of the present invention in combination with the pedal.

FIG. 19 shows crank axle 306 affixed to crank arm 308 at first end 307 via insert 310, while the opposed second end 309 of crank arm 308 is affixed to pedal 312 via insert 314. Sprocket 316 is affixed to axle 306. Second crank arm end 309 is bent outwardly at bend 318 away from axle 306 to provide maximum clearance for foot 320 and heel 322, as heel clearance from the crank arm shown by arrow 324, as well as maximum sprocket clearance, as sprocket clearance from the crank arm shown by arrow 326. Thus, FIG. 19 shows an optimized shape for a tubular crank arm where the tubular portion is bent along the length thereof providing increased heel clearance on one side of the crank arm and increased drive sprocket clearance on the opposite side of the crank arm.

Figure 20A:
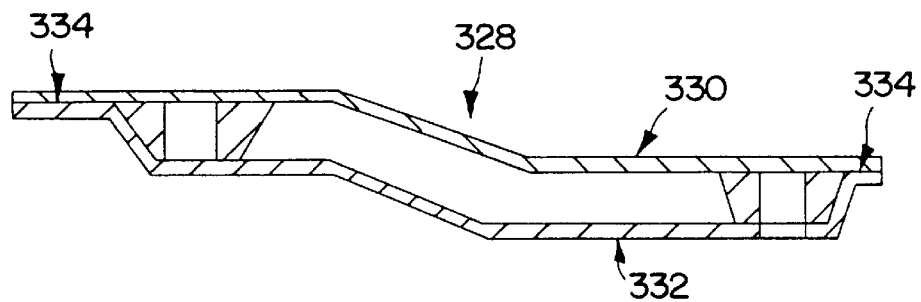
FIGS. 20A and 20B are sectional and perspective views showing a crank arm-insert assembly of the present invention in the assembled and unassembled condition.
Figure 20B:
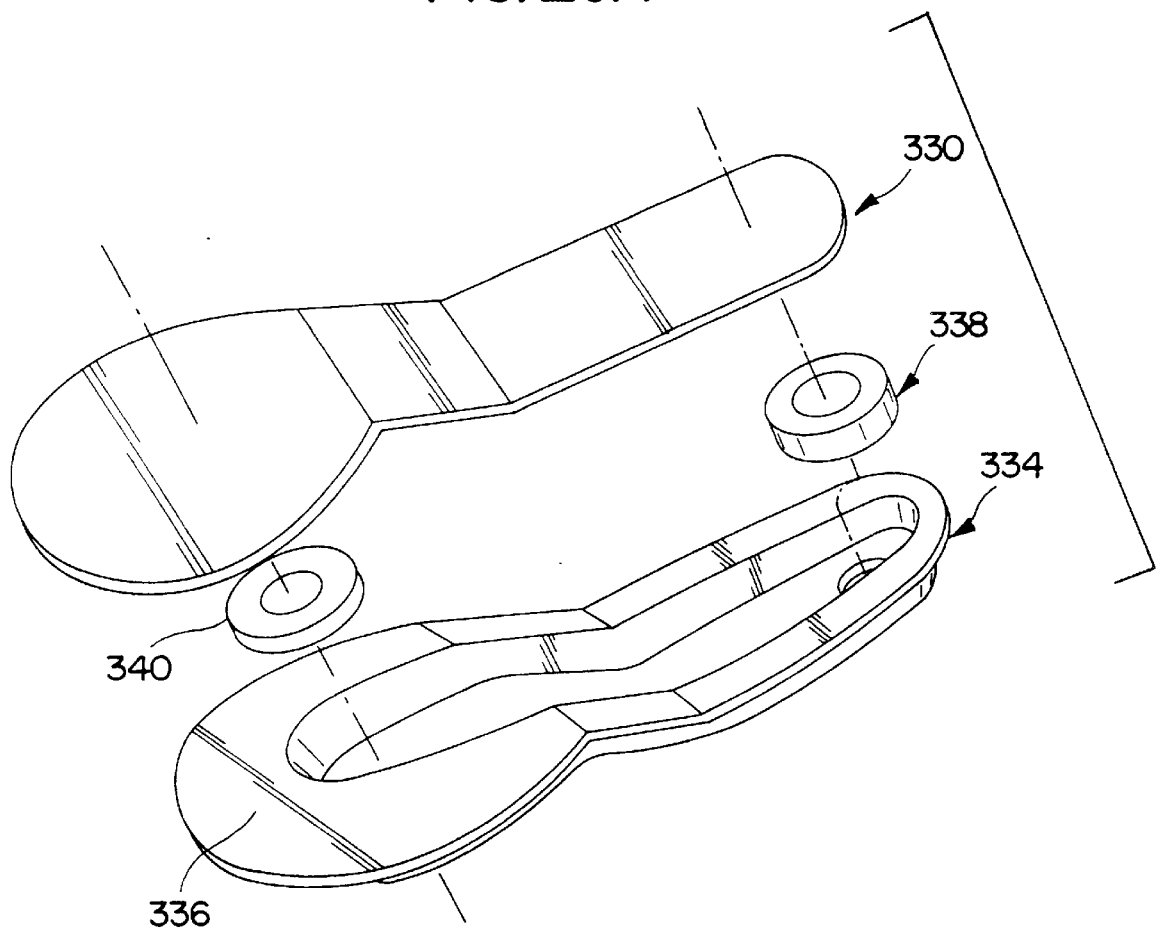

FIGS. 20A and 20B show an alternate crank arm construction where hollow crank arm 328 is formed from at least two shells, as inside shell 330 and outside shell 332 joined together at seams on bond interface 334. A substantial bonding surface 336 or joining flange is provided for a firm bond. The peripheral joining flange provides surface area for the two shells to be joined together, preferably by bonding. This may be accomplished with shells that are of relatively even thickness which makes them easy to mold out of composite material or to stamp or form out of metal sheet. Inserts 338 and 340 are provided for both the axle and pedal end. The two shells may be provided as individual, fully cured components that are each molded separately and then bonded together along the seam. Also, one can co-mold the two shells which would eliminate the bonding operation.

Figure 21A:
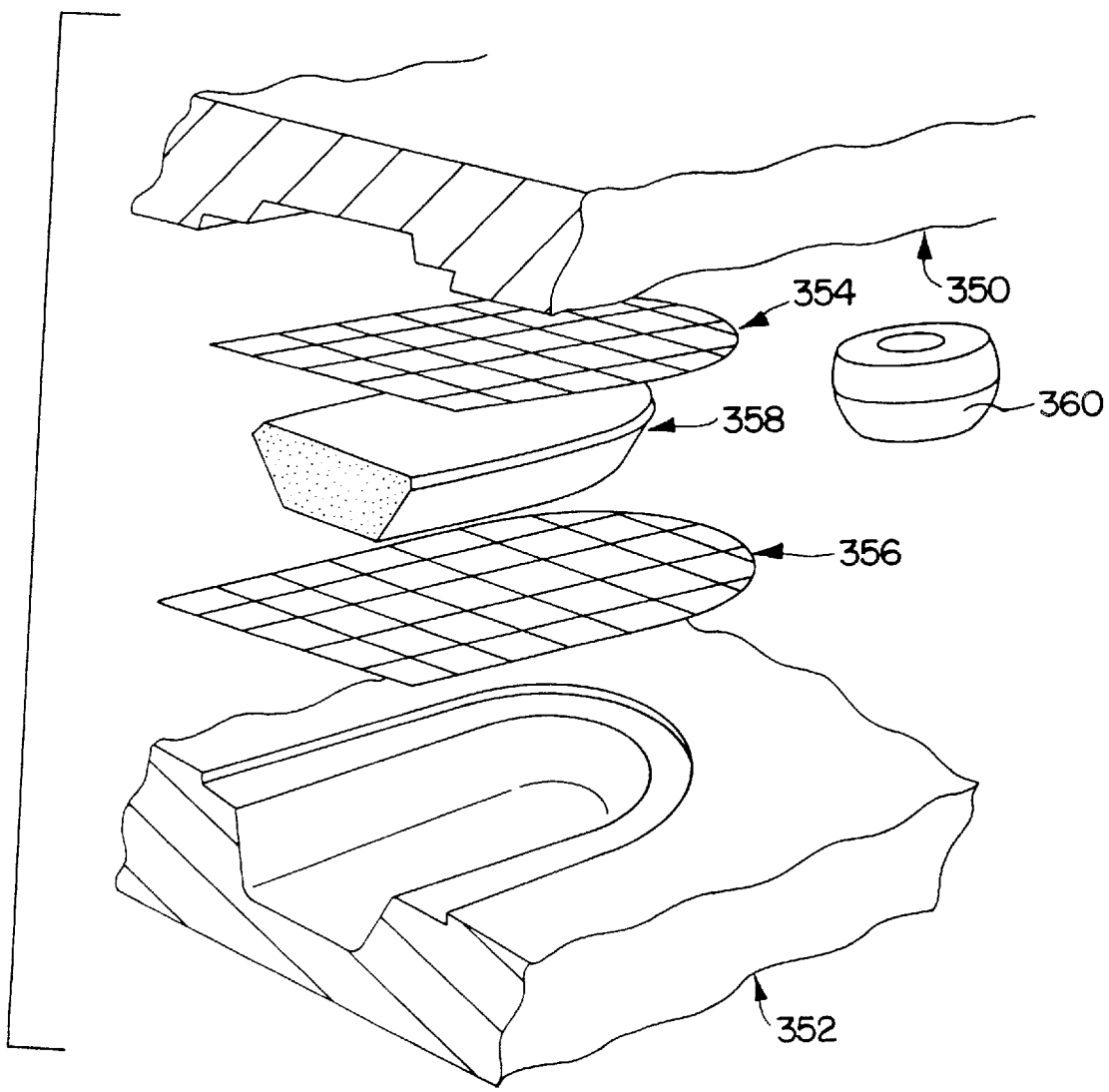
FIGS. 21A, 21B, 21C and 21D show additional embodiments of the present invention.
Figure 21B:
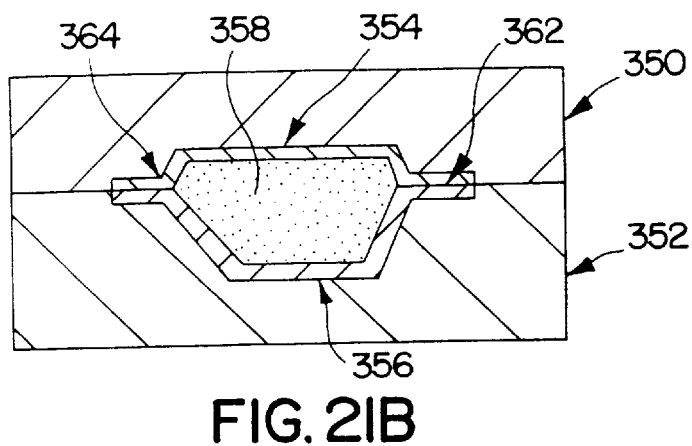
Figure 21C:
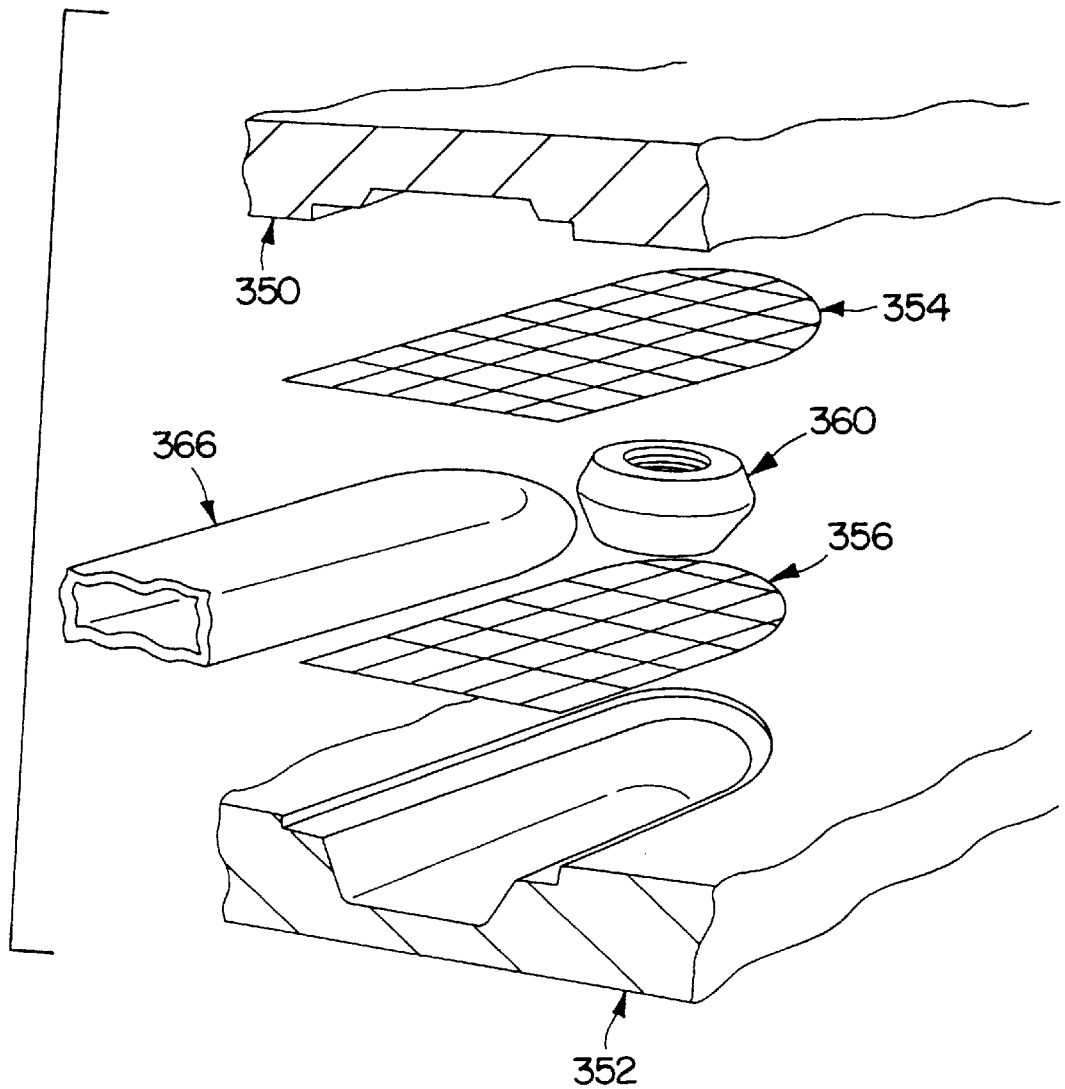

FIGS. 21A, 21B, 21C and 21D illustrate the advantageous embodiment of co-molding the crank arm with the crank arm insert. FIGS. 21A and 21C illustrate a compression molding procedure, including upper mold half 350 and lower mold half 352, where at least two prepreg composite layups 354, 356 are sandwiched around a foam core 358 and insert 360 in FIG. 21A and the sandwich placed between the mold halves. FIG. 21A illustrates the mold open condition and FIG. 21B illustrates the mold closed condition. When the upper and lower mold halves are brought together with the sandwich therebetween as shown in FIGS. 21B (providing pressure), and heat is applied to the mold, the upper and lower prepreg layups become cured and adhered along seam 362. The resultant crank arm 364 includes a foam core 358 and insert 360 firmly bonded therein.

Figure 21D:
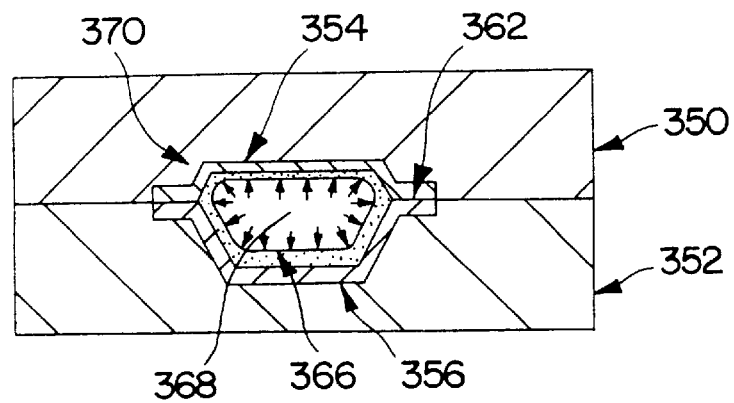

In accordance with FIGS. 21C and 21D, a pneumatic bladder 366 is substituted for foam core 358 of FIG. 21A. During molding as shown in FIG. 21D, bladder 366 is inflated providing pneumatic pressure 368, and heat is applied to the mold. The upper 354 and lower 356 prepreg layups then become cured and adhered to each other along seam 362. The bladder can be removed if desired. The resultant crank arm 370 includes insert 360 firmly bonded therein.

Several variations of FIGS. 21A–21D may be readily employed. Thus, an insert molding method may be used where one of the shell components may be precured while the other is molded, as for example around the precured component. More than two shell components may be used in the constructions.

Alternatively, the flanges of the shell may be turned down to create a lap joint at the seam as shown in FIGS. 22A–22D.

Figure 22A:
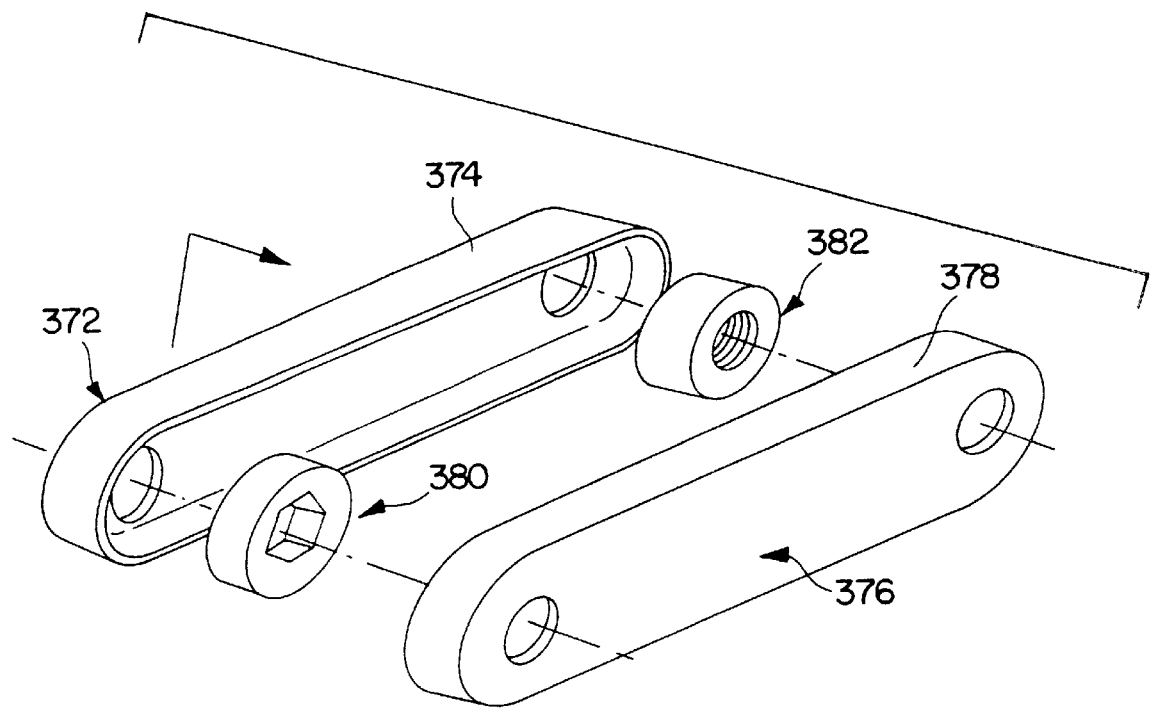
FIGS. 22A, 22B, 22C and 22D show further embodiments of the present invention.
Figure 22B:
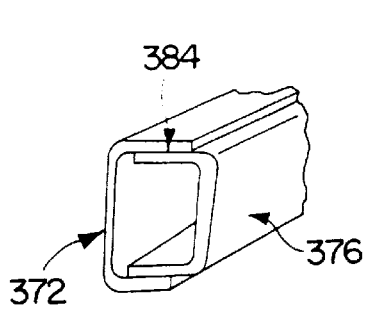
Figure 22C:
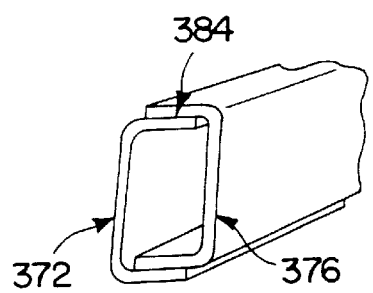
Figure 22D:
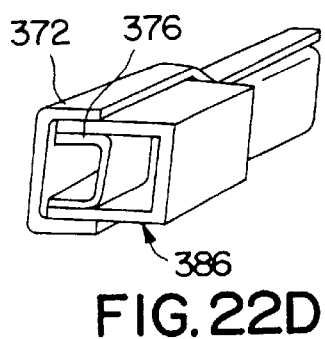

Thus, as shown in FIG. 22A, at least one first or left shell 372 includes turned down flanges 374 and at least one second or right shell 376 includes turned down flanges 378, with inserts 380, 382 therebetween. The components are assembled together with flanges 378 placed inside flanges 374 and the flanges bonded together with inserts 380, 382 bonded therein. FIG. 22B shows left shell 372 overlapping right shell 376, bonded together along seam 384. FIG. 22C shows left shell 372 overlapping one edge of right shell 376 and right shell overlapping the opposite edge of left shell 372, with the components bonded together along seam 384. FIG. 22D is similar to FIG. 22B, with insert 386 bonded between the shells.

It is noted that in FIGS. 20A–20B the flange is in the plane of the crank arm and oriented perpendicular to the crank axle axis; whereas, in FIG. 22A the bonding flange is turned in so that the locus of the mating surfaces are generally parallel to the crank axle axis.

Figure 23A:
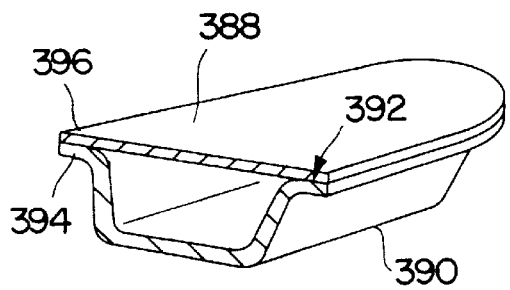
FIGS. 23A, 23B, 23C, 23D, 23E and 23F show still further embodiments of the present invention.

FIG. 23A shows a basic design using inside shell 388 and outside shell 390 bonded together along seam 392 via mating flanges 394, 396. Naturally, at least one insert would be bonded therebetween.

Figure 23D:
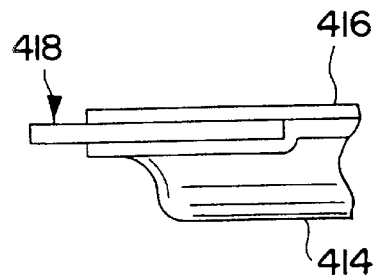
Figure 23B:
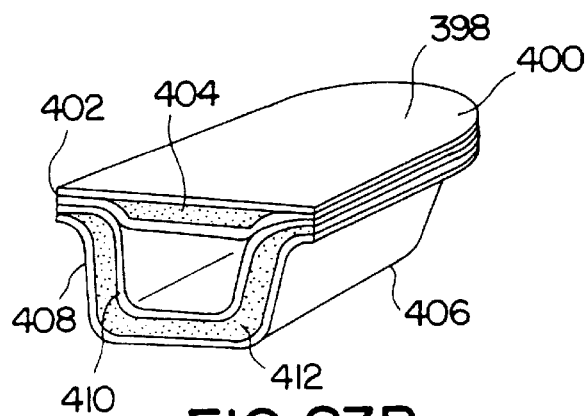

FIG. 23B shows how the shell(s) may be constructed using a foam core construction. Thus, inside shell 398 may include a first layer 400 and a second layer 402 with foam core 404 therebetween, and outside shell 406 may also include a first layer 408 and a second layer 410 with foam core 412 therebetween.

Figure 23E:
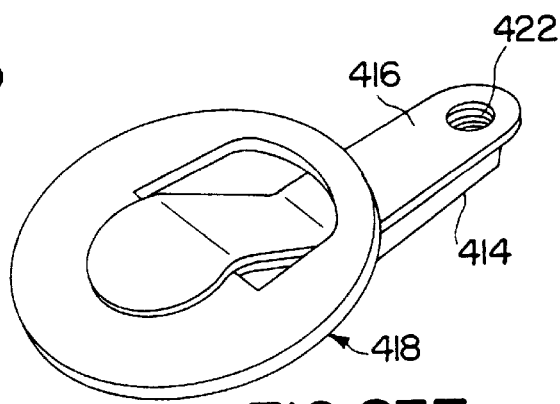
Figure 23C:
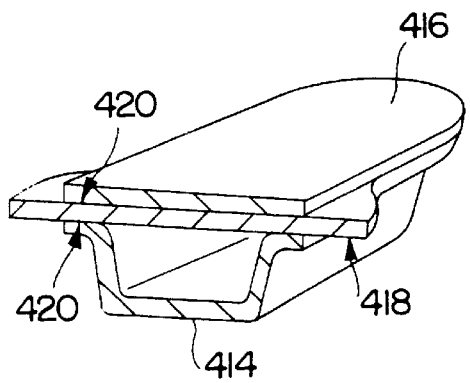

FIGS. 23C and 23D show how an intermediate component may be inserted within the seam of mating shell components. Thus, outside shell 414 and inside shell 416 include intermediate component 418 bonded therebetween at seams 420. As shown in FIG. 23E, this is particularly suited for chainwheel mounting and involves affixing intermediate component 418 within the seams and between the inside and outside shells 416 and 414, respectively, with insert 422 therebetween.

Figure 23F:
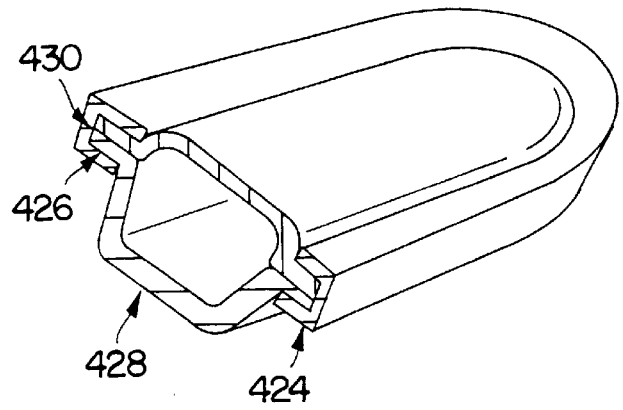

FIG. 23F shows a bonded shell approach with seam joint reinforcement. A U-shaped channel element 424 wraps around flanges 426 of shells 428 at seam 430 to provide reinforcement for the bonded joint. Naturally, mechanical fasteners may be used in addition to or in place of the adhesive bonded joints, and the insert(s) should also be provided.

The crankshaft assembly of the present invention includes highly advantageous features. The tubular crank arm and insert arrangement may be provided where the tubular crank arm element extends past the centerline of the crank axle. Also, the insert may overlap both the inside surface and outside surface of the tubular crank arm for increased strength. The insert may have interlocking notches which mate with the tubular crank arm, thereby augmenting the joint with a mechanical connection. The tubular crank arm may be molded into a bent shape to provide heel clearance for the rider on one side of the crank arm and sprocket clearance on the opposite side of the crank arm. The crank arm and insert may provide that the insert includes means for retaining the drive sprockets. The crank axle may if desired be offset from the centerline of the crank arm. A variety of geometric configurations may be used, as for example, the insert being of non-constant cross-section along its length for structural optimization, geometric considerations (clearances, etc.) and/or mating fitment with the tubular crank arm. The hollow crank arm may be constructed from two or more shell portions which are joined together along a turned out flange which serves to create a bonding seam to connect the two shells. Generally, the crankshaft assembly of the present invention is surprisingly versatile, achieves a high strength assembly and is convenient to manufacture and assemble.

Significant features of the present invention may include a tubular crank arm and insert (including sleeve) assembly where the tubular crank arm extends past the centerline of the crank axle. Also, a tubular crank arm and insert (including sleeve) assembly where the tubular arm includes a mating surface contour which conforms to the insert. In addition, a tubular crank arm and insert (including sleeve) assembly where the tubular arm includes a portion of generally decreasing or non-constant sectional dimension in the region between the crank axle and pedal fitment.

Additional features may include a tubular crank arm and insert (including sleeve) assembly where the insert has interlocking notches which mate with the tubular crank arm, thereby augmenting the joint with a mechanical connection. Additional features may include a tubular crank arm and insert (including sleeve) assembly where the insert includes relieved portion(s) or hollowed out portion(s) for optimized cross-section and weight reduction.

Further features may include a tubular crank arm and insert (including sleeve) assembly where the insert is of non-constant cross-section along its length for structural optimization, geometric considerations (clearances, etc.), and/or mating fitment with the tubular arm. A tubular crank arm and insert (including sleeve) assembly where the tubular arm includes a non-constant cross-section that is particularly tailored to fit with the insert. This could include a splayed or flared end, a bulge, a step, a taper, a closed end, etc.

Further features may include a tubular crank arm and insert (including sleeve) assembly where the wall of the crank arm is notched to accept corresponding geometry in the insert, or vice versa. A tubular crank arm where a reinforcement insert (including sleeve) is introduced to one end of the crank arm and passed through or over the tubular arm to reside at a location remote from said end. A tubular crank arm where a reinforcement insert (including sleeve) is insert molded with the crank arm in a process where an internal expanding element pushes against the adjacent crank arm material to provide compression molding. A tubular crank arm and insert (including sleeve) assembly where the tubular crank arm is constructed from two or more individual longitudinal elements.

Additional features may include a crank arm constructed of two parallel longitudinal tubular elements where a reinforcement or attachment insert is fitted between said elements. A crank arm constructed of two parallel longitudinal elements where a reinforcement or attachment element surrounds at least one of said longitudinal elements. A tubular crank arm and insert (including sleeve) assembly where the insert includes a crank axle portion which extends to a point between the crank axle bearings. A hollow crank arm constructed from two or more shell portions which are joined together along a flange or a turned-out flange which serves to create a bonding seam to connect the two shells. A hollow crank arm constructed from fiber reinforced material where two or more layers are co-molded so that these layers are in contact, either directly or through an intermediate component, along a continuous overlapping seam. During molding, the layers along the seam are joined together to create an integral part.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A bicycle crankshaft assembly comprising: a first crank arm having an end portion thereof; an axle having an end portion thereof, wherein said first crank arm is attached to said axle end portion; a crank arm insert affixed to said axle end portion and said insert affixed to said first crank arm end portion, wherein said insert includes means for connection of said insert to said axle end portion, and wherein said insert and said first crank arm end portion include substantially continuous perimeter surfaces adjacent each other, with said insert and said first crank arm end portion adhered together substantially along their entire continuous adjacent surfaces.

2. An assembly according to claim 1, wherein said first crank arm has an open end portion and wherein said insert is a plug fitted into the open end portion of the first crank arm.

3. An assembly according to claim 1, wherein the axle has a longitudinal axis and wherein the insert is fitted to the first crank arm in a direction generally parallel to the axis of the axle.

4. An assembly according to claim 1, wherein the first crank arm has a longitudinal axis and wherein the insert is fitted to the first crank arm in a direction generally parallel to the axis of the crank arm.

5. An assembly according to claim 1, wherein said insert is of generally circular configuration.

6. An assembly according to claim 1, wherein said first crank arm has an enlarged end portion with an opening therein, and wherein the insert is fitted into said enlarged end portion through the opening therein.

7. An assembly according to claim 1, wherein the first crank arm has an external surface, and wherein said insert is a sleeve having a side thereof fitted over said external surface, and wherein said means for connection is a boss fitted to the side of the sleeve.

8. An assembly according to claim 1, wherein the first crank arm has an external surface, and wherein said insert is a sleeve with an internal cavity fitted over said external surface, and wherein said means for connection protrudes into the internal cavity of the sleeve.

9. An assembly according to claim 1, wherein the first crank arm comprises two separate tubular elements having sides thereof, wherein said separate tubular elements are attached to each other at said sides.

10. An assembly according to claim 1, including a bladder within said first crank arm adjacent said insert.

11. An assembly according to claim 1, wherein said first crank arm is at least one tubular element which is continuous through the insert.

12. An assembly according to claim 1, wherein said first crank arm includes conforming geometry to mate with the insert.

13. An assembly according to claim 1, wherein said means for connection is offset from the central axis of the first crank arm.

14. An assembly according to claim 1, wherein said first of said first crank arm end portion and said insert are bonded together along their adjacent surfaces.

15. An assembly according to claim 1, wherein said first crank arm includes a tubular portion with a side wall surface, wherein the insert contacts a portion of the side wall surface.

16. An assembly according to claim 1, wherein the crank arm is made of moldable composite material including fibers and resin.

17. An assembly according to claim 1, wherein the crank arm is affixed to said insert in a sleeve type connection.

18. An assembly according to claim 1, wherein said crank arm includes an opening, and wherein the insert is affixed to said crank arm in a manner selected from the group consisting of within the opening and around the opening.

19. An assembly according to claim 1, wherein the first crank arm includes a hollow tubular portion and wherein the insert reinforces the hollow tubular portion.

20. An assembly according to claim 1, wherein said insert and said first crank arm end portion are affixed together in an overlapping and interlocked engagement.

21. An assembly according to claim 1, wherein said insert and said first crank arm end portion are affixed together in an interlocking engagement to augment the connection and provide resistance to pedal forces.

22. An assembly according to claim 1, wherein the crank arm is made of metallic material.

23. An assembly according to claim 1, wherein said first crank arm has an external surface and said insert is a sleeve fitted over the external surface of said first crank arm.

24. An assembly according to claim 23, wherein said means for connection is outside the external surface of the first crank arm.

25. An assembly according to claim 1, including a spider attached to said insert.

26. An assembly according to claim 25, wherein said first crank arm includes an annular flange and said insert includes an annular flange, with the flanges engaging each other, wherein the spider is attached to the annular flange of the insert and extends therefrom.

27. An assembly according to claim 1, wherein said first crank arm has a constricted end region, and wherein the insert is fitted within said constricted end region.

28. An assembly according to claim 27, wherein said constricted end region has a closed portion thereof.

29. An assembly according to claim 1, wherein said first crank arm comprises a co-molded assembly with said insert bonded therein.

30. An assembly according to claim 29, including a foam core bonded in said co-molded assembly adjacent said insert.

31. An assembly according to claim 1 wherein said crank arm is hollow.

32. An assembly according to claim 31, wherein said crank arm includes a hollow portion which is at least partially filled with a low density material.

33. An assembly according to claim 1, wherein said insert is fitted to said crank arm in a region proximate to at least a portion of said axle.

34. An assembly according to claim 33, wherein said crank arm and said insert are separately formed and wherein said insert is affixed to said crank arm.

35. An assembly according to claim 1, wherein said first crank arm comprises at least two shells bonded together.

36. An assembly according to claim 35, wherein at least one of said at least two shells includes a foam core.

37. An assembly according to claim 35, including a peripheral joining flange between the shells providing surface area for the shells to be joined together.

38. An assembly according to claim 1, wherein the first crank arm has an inside surface and the insert has an outside surface, wherein the outside surface of the insert engages the inside surface of the first crank arm.

39. An assembly according to claim 38, wherein the first crank arm has an outside surface, and the insert has at least one outside flange that overlaps the outside surface of the first crank arm.

40. An assembly according to claim 38, wherein the first crank arm includes an open end and at least one flange extending towards said open end with said insert engaging said flange.

41. An assembly according to claim 38, including a second insert engaging said insert and said first crank arm.

42. An assembly according to claim 1, wherein said first crank arm is at least one tubular element which at least in part wraps around said insert.

43. An assembly according to claim 42, wherein said insert is in the shape of an annular bobbin with annular flanges defining an annular recess.

44. An assembly according to claim 42, wherein said insert is in the shape of a teardrop shaped bobbin with annular flanges defining an annular recess.

45. An assembly according to claim 42, wherein said first crank arm includes an outer surface, and wherein a portion of said insert wraps around the outer surface of said first crank arm.

46. An assembly according to claim 42, wherein the first crank arm includes an upwardly extending portion which terminates along the length of the first crank arm.

47. An assembly according to claim 1, wherein said first crank arm comprises at least two shells bonded together with at least one insert bonded therebetween.

48. An assembly according to claim 47, wherein said at least two shells with at least one intermediate component are bonded therebetween.

49. An assembly according to claim 47, wherein said at least two shells are bonded together along a bonding seam with a reinforcing element contacting said shells along said bonding seam.

50. An assembly according to claim 47, wherein said shells include turned down flanges and wherein said flanges are bonded together.

51. An assembly according to claim 50, wherein said insert is bonded between said flanges.

52. An assembly according to claim 1, including first and second crank arms each having an end portion thereof, wherein said axle is a crank axle and includes first and second end portions thereof, and wherein the first crank arm is attached to the first of said axle end portions and the second crank arm is attached to the second of said axle end portions.

53. An assembly according to claim 52, wherein the crank axle and insert are connected to each other as a single component.

54. An assembly according to claim 52, wherein the crank axle includes an external flange, and wherein the crank axle is affixed to said insert via said external flange.

55. An assembly according to claim 52, wherein said crank axle includes a shoulder and is part of a bottom bracket assembly and is surrounded by a bottom bracket shell, with at least one bearing between the bottom bracket shell and the crank axle, said bearing including an inner and outer race, including means to clamp said inner bearing race between the crank arm and the shoulder of the crank axle, wherein the crank arm is fitted over the crank axle and the crank axle passes through said bearing.

56. An assembly according to claim 52, wherein said crank axle is a two piece assembly including two axle halves.

57. An assembly according to claim 56, wherein the crank axle halves are secured together at least in part via interlocking splines.

58. An assembly according to claim 52, including a second crank arm insert affixed to the second of said axle end portions and adhered to the second crank arm end portion.

59. An assembly according to claim 58, wherein one of said inserts forms a single piece with said axle, and a second of said inserts is a separate piece.

60. An assembly according to claim 58, wherein both of said inserts form a single piece with said axle.

61. An assembly according to claim 58, wherein at least one crank arm ha s two opposed end portions, said second end portion receiving a pedal for an individual foot and heel, and a sprocket engaging said axle, wherein said second end portion of at least one crank arm are outwardly bent away from said crank axle to provide increased clearance between said crank arm and said heel and between said crank arm and said sprocket.

62. A bicycle crankshaft assembly comprising: first and second crank arms each having end portions thereof; an axle having first and second end portions thereof, wherein said first crank arm is attached to the first of said axle end portions and the second crank arm is attached to the second of said axle end portions; a crank arm insert affixed to said first axle end portion and said insert affixed to said first crank arm end portion, wherein said insert includes means for connection of said insert to said first axle end portion, and wherein the first crank arm includes a tubular portion having a side wall and axis and a continuous perimeter surface, and said insert including an axis with a continuous circumscribing perimeter surface, said insert axis and said insert circumscribing perimeter surface being parallel to the side wall of the first crank arm and parallel to the continuous perimeter surface of the first crank arm, and said circumscribing perimeter surface of the insert contacting the perimeter surface of the first crank arm.

* * * * *